(12) United States Patent
Shek et al.

(10) Patent No.: US 11,526,519 B2
(45) Date of Patent: Dec. 13, 2022

(54) SYSTEM AND METHOD FOR AUTOMATIC DOCKETING AND DATA ENTRY

(71) Applicant: PERRY + CURRIER INC., Toronto (CA)

(72) Inventors: Robert Shek, Toronto (CA); Robert Cotran, Montreal (CA); Christopher Ellefson, Toronto (CA); Daniel Martinet, Toronto (CA); Alan Wong, Toronto (CA); Thomas Andrew Currier, Toronto (CA)

(73) Assignee: PERRY + CURRIER INC., Toronto (CA)

( * ) Notice: Subject to any disclaimer, the term of this patent is extended or adjusted under 35 U.S.C. 154(b) by 13 days.

(21) Appl. No.: 17/047,191

(22) PCT Filed: Mar. 22, 2019

(86) PCT No.: PCT/IB2019/052369
§ 371 (c)(1),
(2) Date: Oct. 13, 2020

(87) PCT Pub. No.: WO2019/197924
PCT Pub. Date: Oct. 17, 2019

(65) Prior Publication Data
US 2021/0165797 A1 Jun. 3, 2021

Related U.S. Application Data

(60) Provisional application No. 62/657,458, filed on Apr. 13, 2018.

(51) Int. Cl.
*G06F 16/242* (2019.01)
*G06F 16/2457* (2019.01)
(Continued)

(52) U.S. Cl.
CPC ...... *G06F 16/24573* (2019.01); *G06F 16/248* (2019.01); *G06F 16/2423* (2019.01); *G06Q 50/18* (2013.01)

(58) Field of Classification Search
CPC .......... G06F 16/24573; G06F 16/2423; G06F 16/248; G06F 16/20; G06F 16/24; G06F 17/00; G06Q 50/18
See application file for complete search history.

(56) References Cited

U.S. PATENT DOCUMENTS 7,885,987 B1 * 2/2011 Lee .................. G06Q 10/10
707/930
2002/0002481 A1 * 1/2002 Uchio ................ G06Q 10/10
705/310

(Continued)

FOREIGN PATENT DOCUMENTS

CA   2986115   12/2016

OTHER PUBLICATIONS

ISA/CA, International Search Report and Written Opinion, dated Jun. 27, 2019, re PCT International Patent Application No. PCT/IB2019/052369.

*Primary Examiner* — Jorge A Casanova
(74) *Attorney, Agent, or Firm* — Perry + Currier

(57) ABSTRACT

An automated data entry system comprising target database servers for storing target database(s), a processing server configured to execute a client-application and configured to store a plurality of data objects including a document schema and a target database schema corresponding to the target database(s), and a client terminal connected to the processing server, configured to: generate a first graphical interface for connection to a target database, and to execute a second graphical interface for connection to the client-application. The processing server may also receive an electronic data file representing an unprocessed document, (Continued)

to associate the unprocessed document with a document schema and extract a data variable based on the document schema, and to generate a database operation comprising the data variable configured according to a target database schema. The client terminal is configured to receive the database operation and execute the database server database operation against a target database.

4 Claims, 25 Drawing Sheets

(51) Int. Cl.
*G06F 16/248* (2019.01)
*G06Q 50/18* (2012.01)

(56) References Cited

U.S. PATENT DOCUMENTS

| | | |
|---|---|---|
| 2004/0103367 A1 | 5/2004 | Riss et al. |
| 2004/0181749 A1 | 9/2004 | Chellapilla et al. |
| 2007/0208669 A1* | 9/2007 | Rivette ............... G06Q 50/184 705/59 |
| 2011/0219300 A1 | 9/2011 | Jindal et al. |
| 2012/0203791 A1* | 8/2012 | Holt ..................... G06Q 10/10 707/758 |
| 2012/0303537 A1* | 11/2012 | Bader .................. G06Q 50/18 705/310 |
| 2014/0180934 A1* | 6/2014 | Surdeanu .............. G06F 16/24 705/310 |
| 2014/0200880 A1* | 7/2014 | Neustel ................ G06F 40/194 704/9 |
| 2014/0201193 A1* | 7/2014 | Kim ....................... G06F 16/93 707/722 |
| 2014/0365386 A1* | 12/2014 | Carstens ............... G06Q 10/10 705/310 |
| 2015/0205777 A1 | 7/2015 | Campanelli et al. |
| 2018/0293678 A1* | 10/2018 | Shanahan ........... G06Q 50/184 |
| 2020/0117718 A1* | 4/2020 | Lundberg .............. G06N 3/084 |
| 2021/0042866 A1* | 2/2021 | Shanahan ........... G06Q 10/103 |
| 2022/0171967 A1* | 6/2022 | Reisswig ............. G06V 30/414 |

\* cited by examiner

1504

UNITED STATES PATENT AND TRADEMARK OFFICE

UNITED STATES DEPARTMENT OF COMMERCE
United States Patent and Trademark Office
Address: COMMISSIONER FOR PATENTS
...
www.uspto.gov

| APPLICATION NUMBER | FILING or 371(c) DATE | GRP ART UNIT | FIL FEE REC'D | ATTY DOCKET NO | TOT CLAIMS | IND CLAIMS |
|---|---|---|---|---|---|---|
| 15/999,999 | 01/17/2018 | 2843 | 1245 | P14520342 | 23 | 4 |

CONFIRMATION NO. 5678

54640
PERRY + CURRIER INC.
1300 YONGE STREET    1508
SUITE 500
TORONTO, ON M4T-1X3
CANADA

FILING RECEIPT

|||||||||| barcode ||||||||||

1516

Date Mailed: 02/12/2018

Receipt is acknowledged of this non-provisional patent application. The application will be taken up for examination in due course. Applicant will be notified as to the results of the examination. Any correspondence concerning the application must include the following identification information: the U.S. APPLICATION NUMBER, FILING DATE, NAME OF APPLICANT, and TITLE OF INVENTION. Fees transmitted by check or draft are subject to collection. Please verify the accuracy of the data presented on this receipt. If an error is noted on this Filing Receipt, please submit a written request for a Filing Receipt Correction. Please provide a copy of this Filing Receipt with the changes noted thereon. If you received a "Notice to File Missing Parts" for this application, please submit any corrections to this Filing Receipt with your reply to the Notice. When the USPTO processes the reply to the Notice, the USPTO will generate another Filing Receipt incorporating the requested corrections Inventor(s)
    Fred F. FLINTSTONE, Toronto, CANADA;
    Charlie BROWN, Toronto, CANADA;

Applicant(s)
    LESLEY TEST CORP., Toronto, CANADA

Power of Attorney: The patent practitioners associated with Customer Number 54640    1512

Domestic Priority data as claimed by applicant
    This appln claims benefit of 62/999,999 01/17/2017

Foreign Applications for which priority is claimed (You may be eligible to benefit from the Patent Prosecution Highway program at the USPTO. Please see http://www.uspto.gov for more information.) - None.
Foreign application information must be provided in an Application Data Sheet in order to constitute a claim to foreign priority. See 37 CFR 1.55 and 1.76.

Permission to Access Application via Priority Document Exchange: Yes

Permission to Access Search Results: Yes

Applicant may provide or rescind an authorization for access using Form PTO/SB/39 or Form PTO/SB/69 as appropriate.

If Required, Foreign Filing License Granted: 02/08/2018 page 1 of 3

SYSTEM AND METHOD FOR AUTOMATIC DOCKETING AND DATA ENTRY

FIELD OF THE INVENTION

The present invention relates to a system and method for addressing the problems of automatically docketing correspondence and automatically entering data and, in particular, addressing these problems using machine learning and artificial intelligence.

BACKGROUND

The advent of the information age has propelled many diverse industries towards maintaining electronic records and using electronic information management tools. For example, legal professionals may maintain electronic records of case files for similar reasons as above. However, in many of these industries the primary means for receiving new documents are either by physical mail, facsimile or electronic mail. In any of these cases, documents must be either manually scanned into electronic formats which can be saved in the electronic records, or the information they contain must be manually found and then entered into the correct areas, such as specific electronic fields. This can create significant data entry obstacles for industries where large amounts of documents and information may be received on a daily basis.

SUMMARY

The present specification provides automatically docketing correspondence and automated data entry. The system and method comprises target database servers for storing target database(s), a processing server configured to execute a client-application and configured to store a plurality of data objects including a document schema and a target database schema corresponding to the target database(s), and a client terminal connected to the processing server, configured to: generate a first graphical interface for connection to a target database, and to execute a second graphical interface for connection to the client-application. The processing server is further configured to receive an electronic data file representing an unprocessed document, to associate the unprocessed document with a document schema and extract a data variable based on the document schema, and to generate a database operation comprising the data variable configured according to a target database schema. The client terminal is configured to receive the database operation and execute the database operation against a target database.

BRIEF DESCRIPTION OF THE DRAWINGS

FIG. 15 depicts an illustrative example of a USPTO filing receipt.

DETAILED DESCRIPTION

Figure 1:
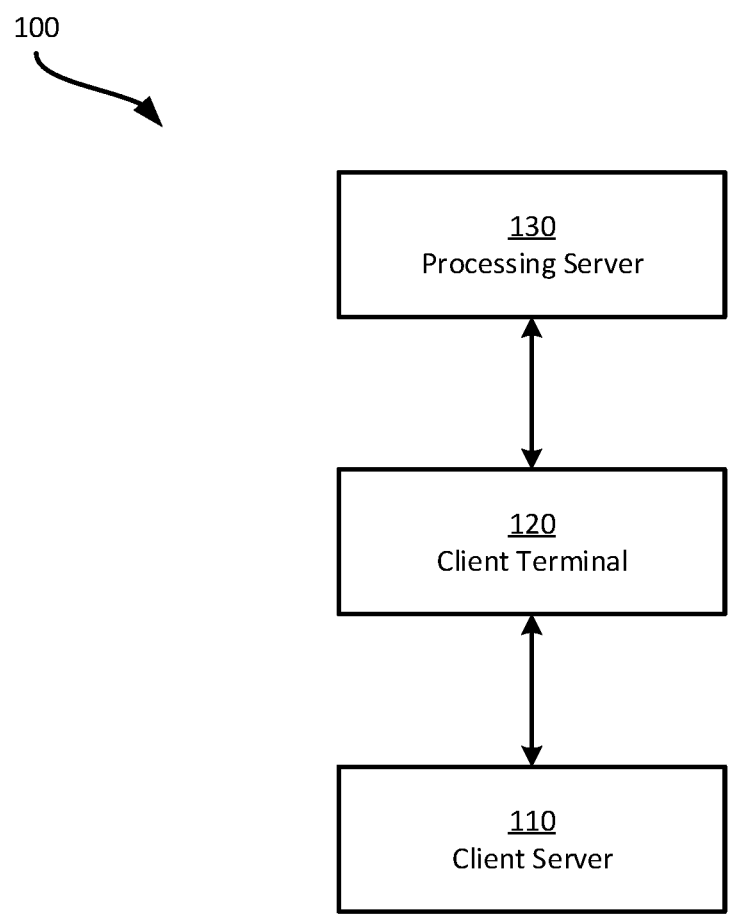
FIG. 1 depicts a system for automatic docketing.

Referring now to the drawings, FIG. 1 depicts a system 100 for automatic docketing.

System 100 includes a processing server 130, a client terminal 120 and a client server 110. Data that is sent from the client server 110 to the processing server 130 is relayed via the client terminal 120. Similarly, data that is sent from the processing server 130 to the client server 110 is relayed via the client terminal 120.

Figure 3:
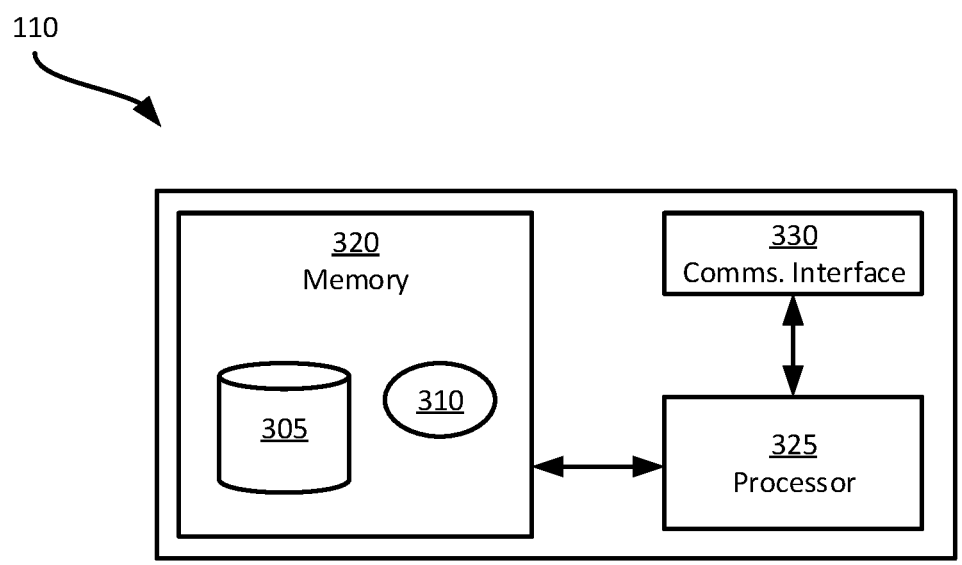
FIG. 3 depicts the client server of FIG. 1.

FIG. 3 depicts the client server 110. The client server 110 can be defined as the server that is on the receiving end of the automatic docketing process. The client server 110 includes a processor 325. The processor 325 may include a central-processing unit (CPU), a microcontroller, a microprocessor, a processing core, a field programmable gate array (FPGA), or similar. The processor 325 may include multiple cooperating processors. The processor 325 may cooperate with a non-transitory computer readable medium such as a memory 320 to execute instructions to realize the functionality discussed herein. The memory 320 may include a combination of volatile (e.g. Random Access Memory or RAM) and non-volatile memory (e.g. read only memory or ROM, Electrically Erasable Programmable Read Only Memory or EEPROM, flash memory). All or some of the memory 320 may be integrated with the processor 325. The memory 320 stores computer readable instructions for execution by the processor 325.

In particular, the memory 320 stores a plurality of applications, each including a plurality of computer readable instructions executable by the processor 325. The execution of the instructions by the processor 325 configures the client server 110 to perform various actions discussed herein. The memory 320 stores a database 305 and a file server 310 application.

The client server 110 also includes a communications interface 330 interconnected with the processor 325. The communications interface 320 includes suitable hardware (e.g. transmitters, receivers, network interface controllers and the like) allowing the client server 110 to communicate with the other computing devices, such as the client terminal 120. The specific components of the interface 330 are selected based on the type of network or other links that the client server 110 is required to communicate over.

The database 305, and file server application 310 may be consolidated on a single server as depicted in FIG. 3, or may be on separate machines or servers on the same network.

The database 305 is the client server docketing database which houses the case information, name record information and docketing fields of the client. The file server 310 is the client server file repository which holds the electronic file wrappers for the case.

A case is a set of data defining a specific matter in a docketing system. A case may track the status of a matter, such as a patent application as it proceeds from the initial client request, through to grant of the application. Each case may have case information such as specific data regarding client information, information for other parties or contacts related to the case, the case title, country and case type. Each case may also contain workflows, each with a specific deadline for completion. Examples of workflows with deadlines for completion, include responding to an office action from the patent and trademark office. Example case types are patents (P), Trademarks™, corporate matters (CO) or similar.

A name record is a set of data defining a specific party in a docketing system. A name record may track various features of the party, such as a name, a name record ID, an address and an email address. A name record may also include financial information specific to the party, such as discounts applicable for that party only.

A name record may be associated with a case to indicate a relevant party on a case. Further, multiple name records may be associated with a single case in different roles. Example roles include the client, the client correspondence (the point of contact for the particular case), and the account correspondence (the point of contact for accounting or invoices associated with the particular case). For example, name record A may be the point of contact for receiving instructions, while name record B may be the accounting department to whom invoices are sent.

A docketing field is a field that diarizes or tracks the specifics of an event that has occurred or is expected to occur on a case. An example of a docketing field is a "patent filing receipt received date", where the value associated with the docketing field showcases the date that the docketing system received the filing receipt from the patent and trademark office.

Each case is also associated with a set of files or documents. This is the electronic file wrapper. Examples of files in the electronic file wrapper include stored copies of correspondence, emails, formal filing documents and any accompanying files that are related to the case.

Figure 4:
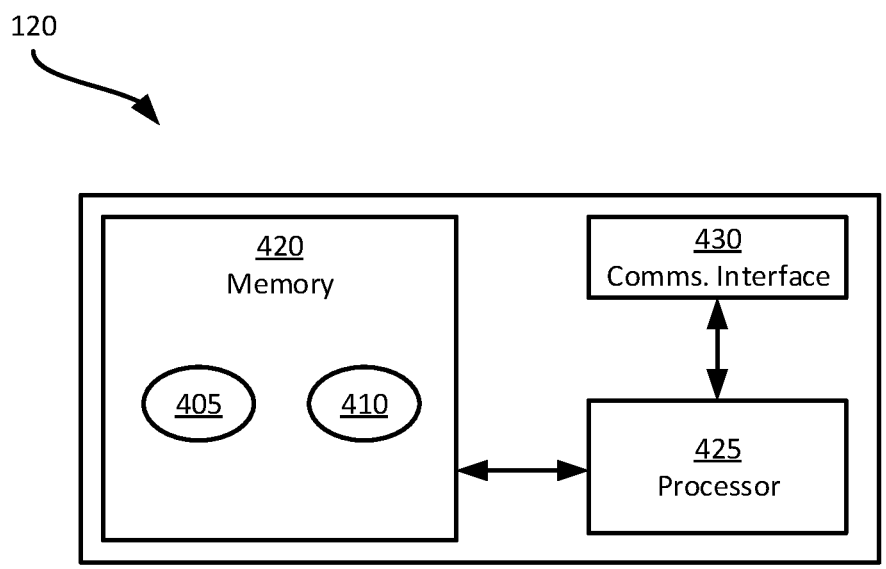
FIG. 4 depicts the client terminal of FIG. 1.

FIG. 4 depicts the client terminal 120. The client terminal 120, can be defined as the user input terminal to provide information to the system 100. The client terminal 120, can be defined as the relay point in the automatic docketing process. The client terminal 120 includes a processor 425. The processor 425 may include a central-processing unit (CPU), a microcontroller, a microprocessor, a processing core, a field programmable gate array (FPGA), or similar. The processor may include multiple cooperating processors. The processor 425 may cooperate with a non-transitory computer readable medium such as a memory 420 to execute instructions to realize the functionality discussed herein. The memory 420 may include a combination of volatile (e.g. Random Access Memory ("RAM")) and non-volatile memory (e.g. read only memory ("ROM"), Electrically Erasable Programmable Read Only Memory ("EEPROM"), or flash memory). All or some of the memory 420 may be integrated with the processor 425. The memory 420 stores computer readable instructions for execution by the processor 425.

In particular, the memory 420 stores a plurality of applications, each including a plurality of computer readable instructions executable by the processor 425. The execution of the instructions by the processor 425 configures the client terminal 120 to perform various actions discussed herein. The applications stored in the memory 420 include a tunnel client 405 and a web browser 410.

The client terminal 120 also includes a communications interface 430 interconnected with the processor 425. The communications interface 430 includes suitable hardware (e.g. transmitters, receivers, network interface controllers and the like) allowing the client terminal 120 to communicate with the other computing devices, such as the client server 110 and the processing server 130. The specific components of the interface 430 are selected based on the type of network or other links that the client terminal 120 is required to communicate over.

The tunnel client 405, and the web browser 410 may be consolidated on a single terminal as depicted in FIG. 4, or may be on separate terminals or servers on the same network.

The tunnel client 405 is the client terminal 120 end of the tunnel, and is a software that executes on the client terminal 120 computer. The tunnel is a secure bi-directional data pipe that allows for the transfer of data between the processing server 130 and the client terminal 120 and its subnet, including the client server 110. Data and database operations can then be sent from processing server 130 to client server 110, using client terminal 120 as a relay to determine the subnet and destination address of client server 110. Data and database operations can also be sent from client server 110 to processing server 130, using client terminal 120 as a relay, allowing processing server 110 to determine the origin of the aforementioned data and database operations. The web browser 410 acts as the front-end interface that is used to provide inputs.

Figure 5:
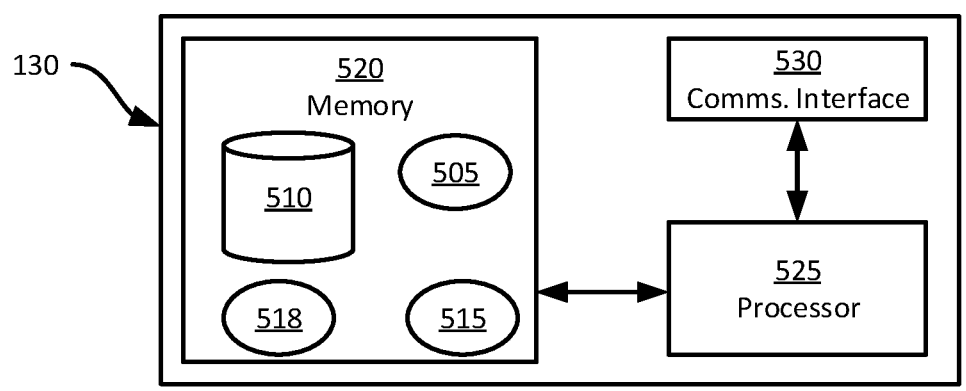
FIG. 5 depicts the processing server of FIG. 1.

FIG. 5 depicts the processing server 130. The processing server 130 performs document processing and can generate data for insertion into database 305. The processing server 130 includes a processor 525. The processor 525 may include a central-processing unit (CPU), a microcontroller, a microprocessor, a processing core, a field programmable gate array (FPGA), or similar. The processor may include multiple cooperating processors. The processor 525 may cooperate with a non-transitory computer readable medium such as a memory 520 to execute instructions to realize the functionality discussed herein. The memory 520 may include a combination of volatile (e.g. Random Access Memory or RAM) and non-volatile memory (e.g. read only memory or ROM, Electrically Erasable Programmable Read Only Memory or EEPROM, flash memory). All or some of the memory 520 may be integrated with the processor 525. The memory 520 stores computer readable instructions for execution by the processor 525.

In particular, the memory 520 stores a plurality of applications, each including a plurality of computer readable instructions executable by the processor 525. The execution of the instructions by the processor 525 configures the processing server 130 to perform various actions discussed herein. The memory 520 stores a tunnel service 505, a database 510, a web engine 515 and a file system 518.

The processing server 130 also includes a communications interface 530 interconnected with the processor 525. The communications interface 530 includes suitable hardware (e.g. transmitters, receivers, network interface controllers and the like) allowing the processing server 130 to communicate with the other computing devices, such as the client terminal 120. The specific components of the interface 530 are selected based on the type of network or other links that the processing server 130 is required to communicate over.

The tunnel server 505, database 510, web engine 515 and file system 518 may be consolidated on a single server as depicted in FIG. 5, or may be on separate machines or servers on the same network.

The tunnel server 505 is the processing server 130 end of the tunnel, and is an application that executes on the processing server 130. The database 510 is the processing server 130 docketing database which houses incoming correspondence data that is used for automatic docketing. The web engine 515 is the back end processing engine for automatic docketing. The file system 518 stores all the incoming correspondence files.

Incoming correspondence is communication that is received from the patent and trademark office containing information pertinent to a case being handled by the aforementioned patent and trademark office. An example of an incoming correspondence is a patent filing receipt from the United States Patent and Trademark Office. Incoming correspondence can take the form of paper documents, electronic documents, structured data or machine readable data. Examples of electronic documents include Portable Document Format ("PDF") files. Examples of structured data or machine readable data include Javascript Object Notation ("JSON") files and Extensible Markup Language ("XML") files. Incoming correspondence data is the data parsed using the web engine 515 from the incoming correspondence received from patent and trademark offices for the purposes of docketing. Using the same example of a patent filing receipt from the United States Patent and Trademark Office, incoming correspondence data includes, the application number, the filing date, the group art unit number, the inventors, the applicants, and the priority data.

Figure 2:
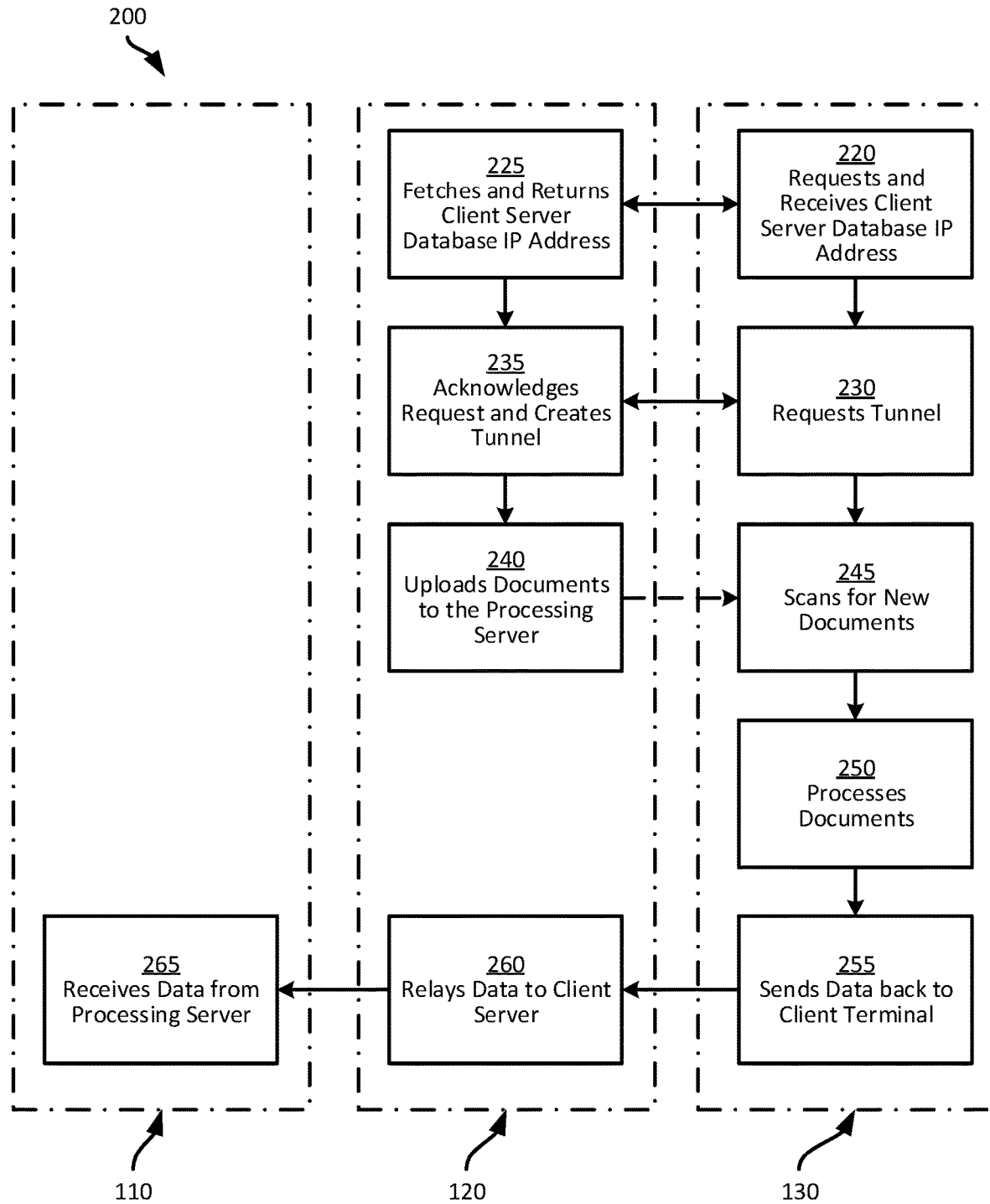
FIG. 2 depicts a method of automatic docketing.

FIG. 2 depicts a method 200 of automatic docketing, and includes the transfer of data between the processing server 130, the client terminal 120 and the client server 110. The dashed lines with an arrow indicate inputs. The dash-dot lines indicate which component of the system 100 performs certain subsets of the blocks in the method 200. Method 200 is initialized as soon as web browser 410 and tunnel client 405 are activated on client terminal 120.

The IP address of the client server database may now be determined. The purpose of obtaining the IP address is to know the destination point for data distribution via the tunnel.

Block 220 depicts the processing server 130 requesting and receiving the client server database 305 IP address. Block 225 depicts the client terminal 120 fetching the client server database 305 IP address (in response to the request from the server 130) and returning the IP address to the processing server 130.

Figure 6:
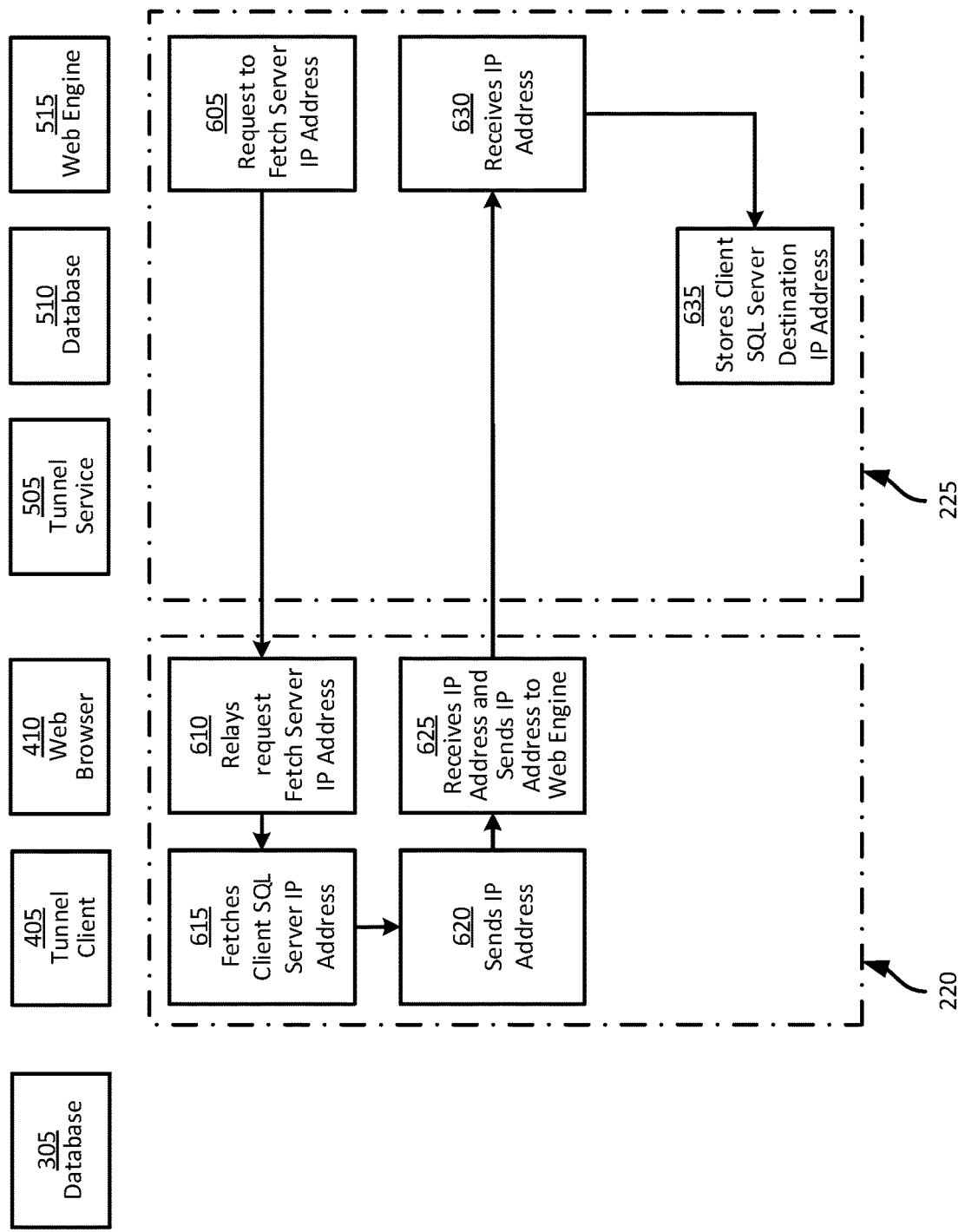
FIG. 6 depicts an example implementation of the processing server requesting and receiving the client server database IP address, and the client terminal fetching the client server database IP address and returning the IP address to the processing server.

FIG. 6 is an example implementation of blocks 220 and 225.

Block 605 depicts the request by the processing server web engine 515 to obtain the IP address of the client server database 305. The request is received by the client terminal web browser 410 and relayed to the client terminal tunnel 405, as depicted in block 610. Block 615 depicts the client terminal tunnel client 405 fetching the IP address of the client server database 305 from client server 110. The IP address is then sent in Block 620 to the client terminal web browser 410, which is then relayed in Block 625 to the processing server web engine 515. Block 630 depicts the receipt of the IP address, which is the response to the request in block 605. The IP address is then stored in the processing server database 510, as shown in block 635.

Once the IP address of the client server database 305 is saved in the processing server database 510, the processing server 130 will have a destination to send all processed data via the tunnel.

The tunnel may now be created. The purpose of creating the tunnel is to allow for secure bi-directional transfer of data that will use the client terminal 120 as a relay to access the subnet, including the client server 110. The creation of the tunnel between processing server 130 and client terminal 120, along with the IP address information of client server database 305, provides processing server 130 the ability to send data and database operation to client server database 305. For example, data or database operations are sent from processing server 130 to client terminal 120, along with the destination IP address. Client terminal 120 is on the same subnet as client server database 305, which allows client terminal 120 to relay the data or database operations to the destination IP address, which is the client server database 305. This also allows indirect access to the client server 110 without the need to compromise firewalls for direct communication. The indirect access allows the processing server web engine 515 to perform queries and send data to the client server database 305 by relaying through the endpoints of the tunnel, the client terminal tunnel client 405 and the processing server 130 tunnel server 505. Furthermore, it allows the secure transfer of files from the processing server 130 to arbitrary locations on the client terminal file server 310, using client terminal 120 as a relay.

Returning to FIG. 2, Block 230 depicts the processing server 130 requesting the creation of the tunnel to the client server 110. Block 235 depicts the client terminal 120 acknowledging the request from the processing server 130, and then opening the tunnel.

Figure 7:
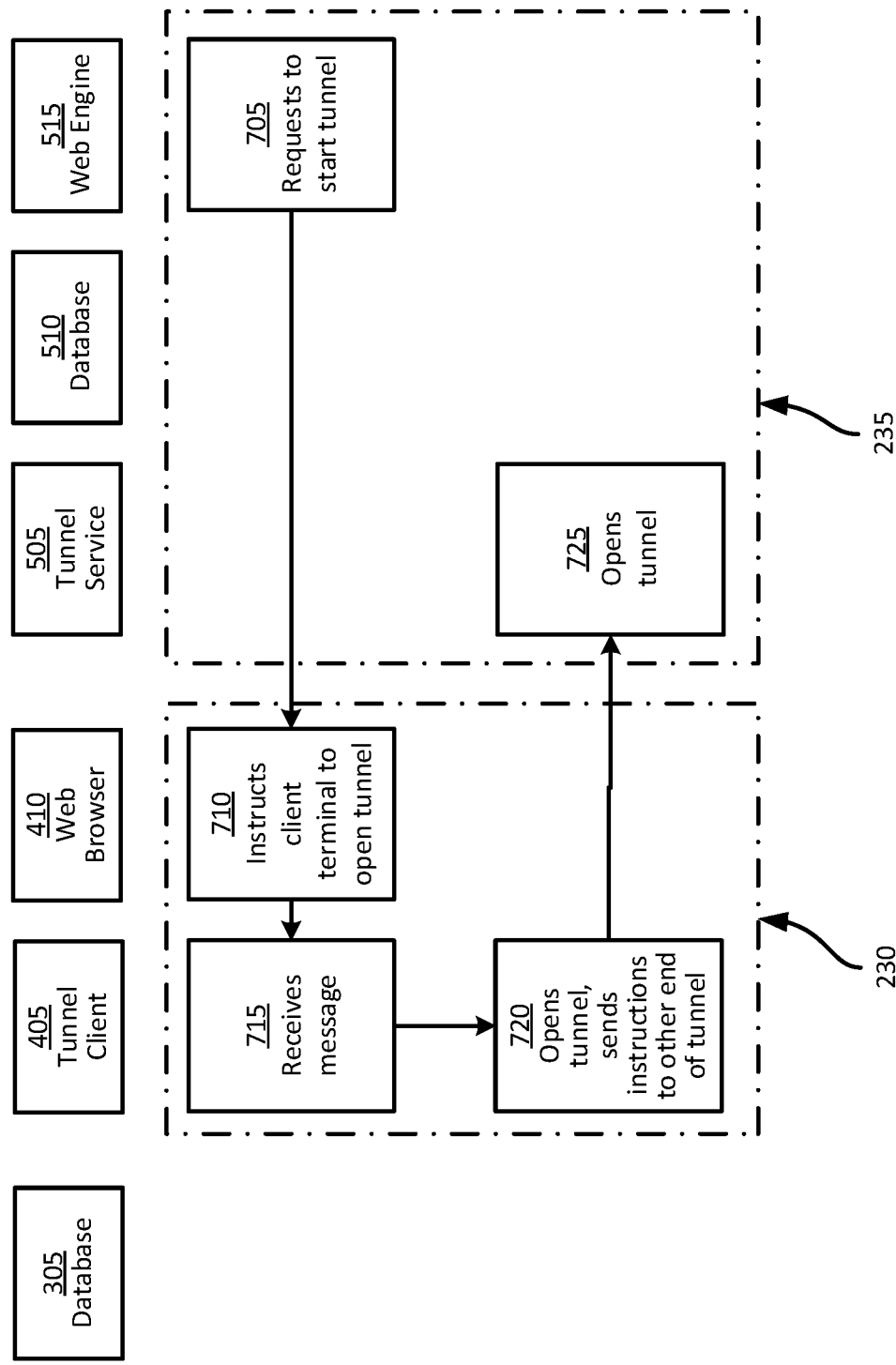
FIG. 7 depicts an example implementation of the processing server requesting the creation of the tunnel to the client server, and the client terminal acknowledging the request from the processing server and then opening the tunnel.

FIG. 7 is an example implementation of blocks 230 and 235.

The client terminal tunnel client 405 is deployed onto the client terminal 120 via an application that is downloaded (e.g. from the processing server 130) initially via the client terminal web browser 410 by the user. The client terminal tunnel client 405 controls the opening and closing the tunnel and also provides a local API with endpoints for the client terminal web browser 410. The processing server tunnel service 505 is an application run from memory on the processing server 130. The client terminal tunnel client 405 and the processing server tunnel service 505 are considered the two end points of the tunnel, once the tunnel is activated.

Block 705 depicts the request by the processor web engine 515 to create the tunnel. The request is sent via the client terminal web browser 410, which instructs the client terminal tunnel client 405 to activate the tunnel, as depicted in block 710. Block 715 depicts the client terminal tunnel client 405 receiving the request to start the tunnel, and in block 720, then tunnel is created. The instruction to open the tunnel is then sent to the processing server tunnel service 505, to open the second endpoint of the tunnel. The second endpoint of the tunnel is then opened in block 725. The tunnel is now ready for secure bi-directional data transfer.

Processing of the documents may now take place. Incoming correspondence is uploaded from the client terminal 120 to the processing server 130, allowing the processing server 130 to process the incoming correspondence documents. This parses and transforms the data to prepare it to be written and docketed to the client server database 305.

Returning to FIG. 2, Block 240 depicts the uploading of incoming correspondence from the client terminal 120 to the processing server 130. Incoming correspondence can be uploaded via the client terminal web browser 410, and is picked up by the processing server web engine 515. Block 245 depicts the processing server 130 scanning for new incoming correspondence. Upon a new document being detected, the document is processed in Block 250. The resulting output is processed data, which is a structured machine readable data representation of the original information from the uploaded incoming correspondence. After block 250, the processed data is ready to be docketed and written to the client server database 305.

Figure 8:
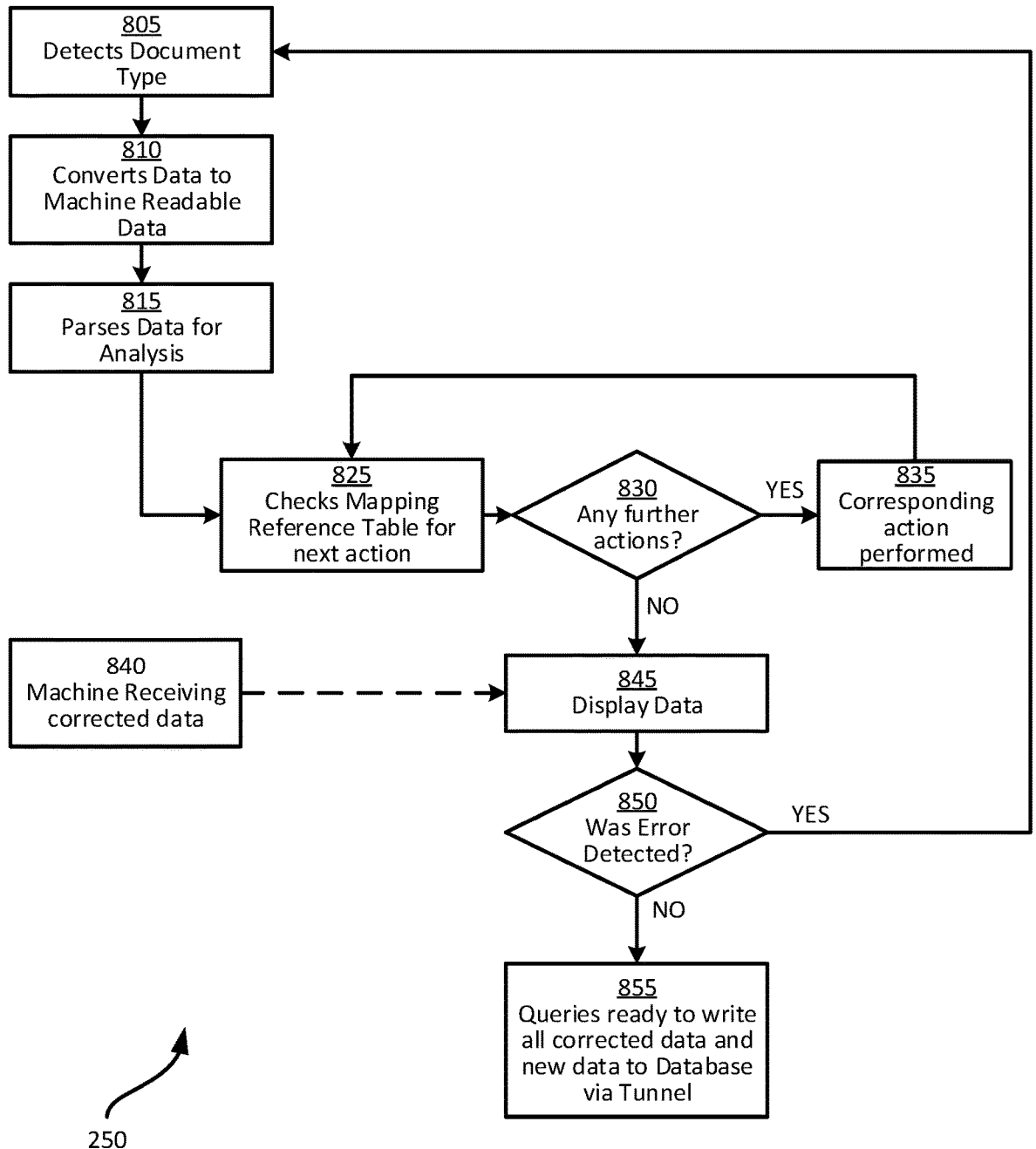
FIG. 8 depicts an example implementation of a document being processed, upon a new document being detected.

FIG. 8 is an example implementation of block 250.

Block 805 depicts the determination of the document type. A document type is the type of incoming correspondence. An example of this is a United States Patent and Trademark Office notice of allowance and fee(s) due. Another example of this is the United States Patent and Trademark Office information notice to applicant. The document type acts as a template in determining the relevant fields that are required to be docketed, and hence converted to machine readable data as depicted in Block 810. An embodiment of block 810 is to take a scanned document, and then use optical recognition to pull the necessary data from the document and put it into a JSON file.

The machine readable data is then parsed in block 815 to transform the data into the previously defined incoming correspondence data. An example of parsing the data in block 815 is removing any symbols from the text, redefining the dates to a certain standard (e.g. changing the text of a date from DD/MM/YY to MM/DD/YY), or removing unnecessary or excess data. Parsing the data is done to normalize the data and bring the data into the same format that the client server database 305 uses. The data is then verified against the client server database 305 through use of the tunnel. This is further explained in FIG. 9. Block 825 depicts using a mapping reference table that is stored on database 510 as a guide to determine the relevant matching fields, and to determine the next actions. If there are further verification actions at block 830, then the corresponding verification action is performed in block 835. The loop then repeats itself until there are no further actions to perform.

An embodiment of this is the processing of a United States Patent and Trademark Office patent filing receipt. In the document type of a United States Patent and Trademark Office patent filing receipt, the corresponding incoming correspondence data is the following:
1. Attorney Docket Number
2. Applicants
3. Inventors
4. Title
5. Group Art Unit
6. Filing Date
7. Application Number
8. Confirmation Number
9. United States Patent and Trademark Office Customer Number
10. Document Received Date
11. Domestic Priority Data
12. Foreign Applications An example of the mapping reference table would be as follows:

TABLE 1

Example Mapping Reference Table

| | Field | Action | Location | Is the Field Optional? |
|---|---|---|---|---|
| 1 | Attorney Reference Number | Retrieve Reference Number | Case Number Reference | FALSE |
| 2 | Applicant(s) | Verify Value | Name Record Applicant Field | FALSE |
| 3 | Inventor(s) | Verify Value | Name Record Inventor Field | FALSE |
| 4 | Title | Verify Value | Title Field | FALSE |
| 5 | Grp Art Unit | Set Value | Docketing Field #20164 | TRUE |
| 6 | Filing Date | Verify Value | Docketing Field #1394 | FALSE |
| 7 | Application No. | Verify Value | Docketing Field #2 | FALSE |
| 8 | Confirmation No. | Set Value | Docketing Field #20163 | FALSE |
| 9 | USPTO Customer Number | Set Value | Docketing Field #20058 | FALSE |
| 10 | Received Date | Set Value | Docketing Field #20097 | FALSE |
| 11 | Domestic Priority Data | Verify Value | Domestic Priority Data Field | TRUE |
| 12 | Foreign applications | Verify Value | Foreign Applications Field | TRUE |

Based on the mapping reference table above, the following actions would be performed in blocks 825, 830 and 835:
1. The attorney reference number would allow the processing server web engine 515 to retrieve the reference number and pull the corresponding case up in the client server database 305, and all of its relevant information
2. The applicant data on the filing receipt would be compared to the value on the client server database 305 in the name record applicant field.
3. The inventor data on the filing receipt would be compared to the value on the client server database 305 in the name record inventor field.
4. The title data on the filing receipt would be compared to the value on the client server database 305 in the title field.
5. If the group art unit is present on the filing receipt, the value would be saved for later processing.
6. The filing date on the filing receipt would be compared to the value on the client server database 305 in docketing field reference number 20164.

7. The application number on the filing receipt would be compared to the value on the client server database 305 in the docketing field reference number 2
8. The confirmation number on the filing receipt would be saved for later processing.
9. The United States Patent and Trademark Office Customer Number would be saved for later processing.
10. The received date on the filing receipt would be saved for later processing.
11. If the domestic priority data is present on the filing receipt, the value would be compared to the value on the client server database 305 in the domestic priority data field.
12. If the foreign applications data is present on the filing receipt, the value would be compared to the value on the client server database 305 in the foreign applications field.

Block 845 depicts the display of the parsed fields of the incoming correspondence data, data from the client server database 305 and their corresponding actions, on web browser 410 on client terminal 120. Any data that is incorrect can be corrected through block 840, which shows the client terminal 120 receiving corrected data, which is subsequently sent back to processing server 130. An example of the source for corrected data, is user input via the client terminal 120. Any data that is corrected at block 840, such as the wrong document type, is sent back to block 805 for reprocessing with additional input to correct the error, as depicted at block 850. If there are no errors detected, the data is prepared to be written back via the tunnel to the client server database 305 as depicted in block 855.

If we are to take the aforementioned embodiment of the United States Patent and Trademark Office patent filing receipt, all the data would be displayed. Any data during the verification process that does not match between the incoming correspondence data and the client server database 305 data can be corrected via user input. If there are any errors, such as the wrong document type, the incoming correspondence is sent back with corrected data or the corrected document type to the initial processing step to be reprocessed. If there are no errors, the data fields having set actions and the corrected values are then ready to be written into the client server database 305.

Communication via the tunnel may now take place. Returning to FIG. 2, Block 255 depicts the processing server 130 sending back the processed data to the client server 110 via the client terminal 120 in Block 260. Block 265 showcases the client server 110 receiving the processed data.

Figure 9:
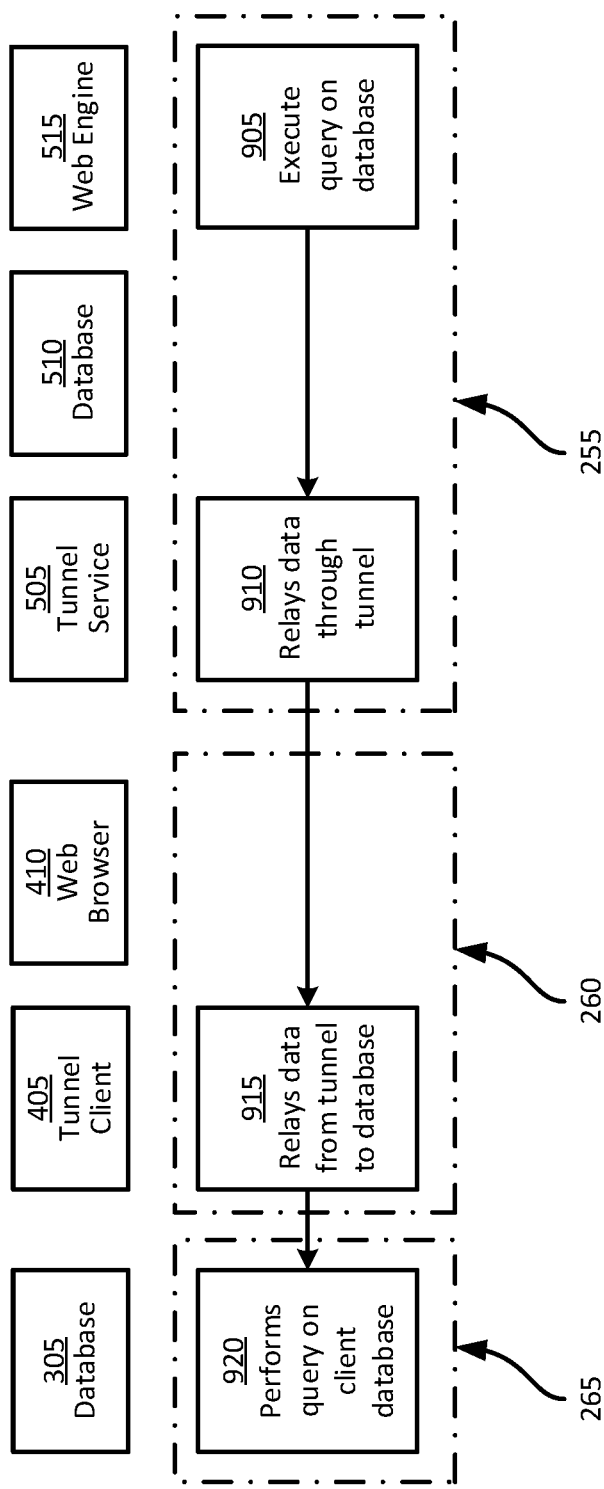
FIG. 9 depicts an example implementation of the processing server sending back the processed data to the client server via the client terminal and showcasing the client server receiving the processed data.

FIG. 9 depicts further clarification of the method of sending the processed data from the processing server 130 to the client server 110, via the tunnel.

Block 905 depicts the sending of the command to execute the write query on the client server database 305. The command is sent from the processing server web engine 515, and is relayed through the entrance of the tunnel, the processing server tunnel service 505, and out the other end of the tunnel on the client terminal tunnel client 405, as depicted in blocks 910 and 915. The command is then relayed to the client server database 305, and the query is performed on the database.

Another embodiment of the tunnel is to use a read query, where the read query is sent from the processing server web engine 515 to the client server database 305, and the resulting data is sent back from the client server database 305 to the processing server web engine 515, through the bi-directional tunnel. An example of a read query is in FIG. 8 in blocks 825, 830 and 835.

Figure 10:
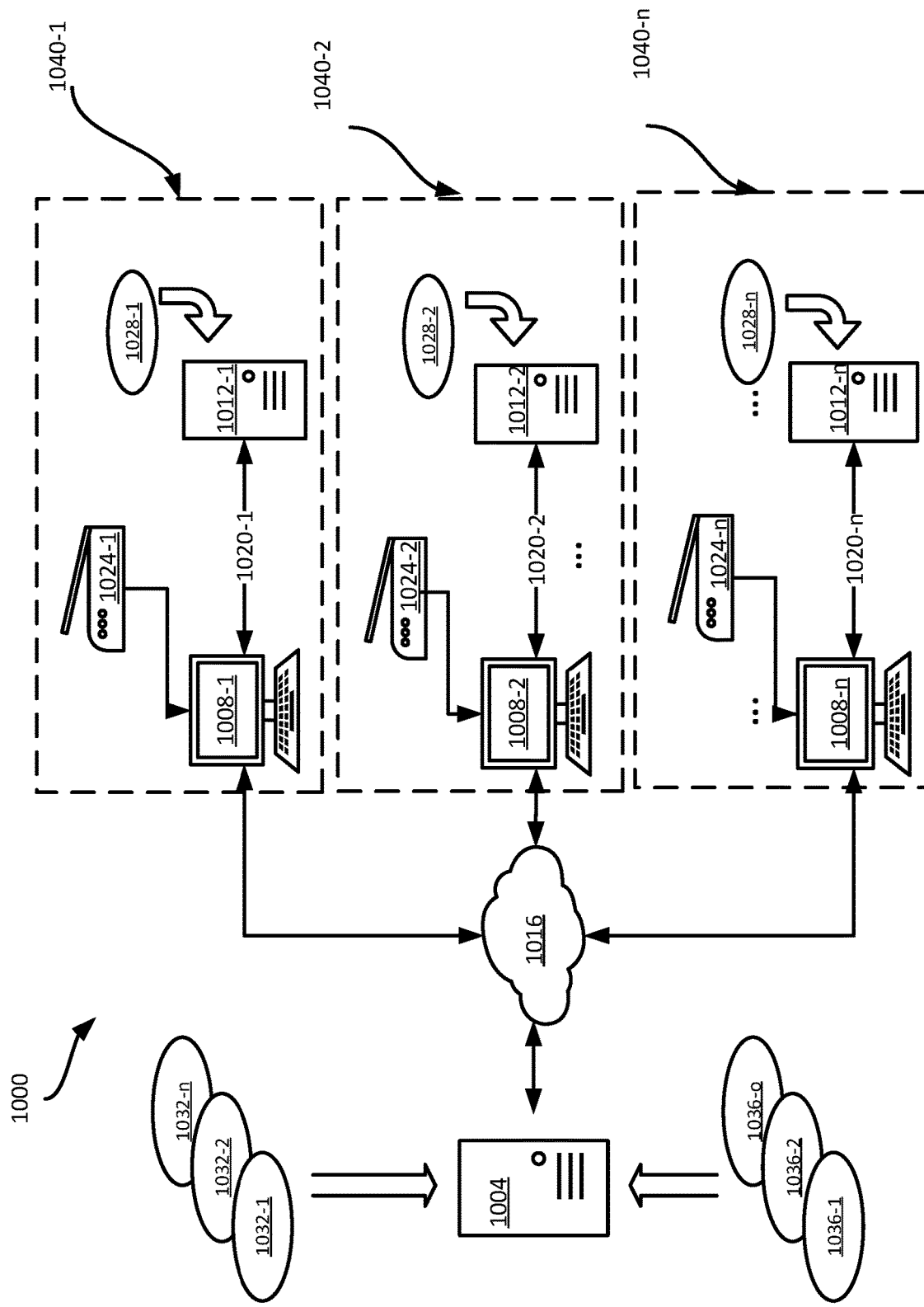
FIG. 10 depicts an automated data entry system.

Variants on the foregoing will now be understood by those skilled in the art, for clarity however, certain additional embodiments are herein also provided for an automated data entry system. Referring to FIG. 10, an automated data entry system is indicated generally at 1000 (System 1000 is an example implementation of system 100). System 1000 comprises a processing server 1004 (Processing server 1004 is an example implementation of processing server 130), coupled to a plurality of client terminals 1008-1, 1008-2 . . . 1008-$n$, each of which communicates with a respective database server 1012-1, 1012-2 . . . 1012-$n$. (Client terminals 1008 are referred to herein generically as client terminal 1008 and collectively as client terminals 1008. This nomenclature is used elsewhere herein.) (Client terminal 1008 is an example implementation of client terminal 120). (Database server 1012 is an example implementation of client server 110). Additionally, a scanner 1024 is connected to each client terminal 1008.

Processing server 1004 connects to client terminals 1008 via a wide area network 1016. Hereafter, wide area network 1016 will be referred to as WAN 1016. (WAN 1016 is an example implementation of the connection between processing server 130 and client terminal 120). In turn, each client terminal 1008 is connected to its respective database server 1012 via a data link 1020 (Datalink 1020 is an example implementation of the connection between client terminal 120 and client server 110, which includes, but is not limited to the aforementioned subnet). A person skilled in the art will now recognize WAN 1016 and data links 1020 are not particularly limited in their configuration. For example, WAN 1016 and data links 1020 can all be implemented over the Internet. In a present embodiment, however, it is contemplated that WAN 1016 is implemented over the Internet, while data links 1020 are implemented as local area networks (LAN) interconnecting each client terminal 1008 with its respective database server 1012. Any desired levels and types of security and encryption protocols are contemplated and can be implemented over WAN 1016 or links 1020 or both of them.

System 1000 further includes a plurality of software objects respective to processing server 1004 and database servers 1012. More particularly, each database server 1012 stores a respective database 1028 (database 1028 is an example implementation of database 305) while processing server 1004 stores at least one target database schema 1032 and at least one document schema 1036 (database schema 1032 and document schema 1036 is an example implementation of mapping reference table on database 510). Processing server 1004 also maintains one or more Application Program Interface(s) (API(s)) programmed with protocols and routines for native interaction with a respective target database schema 1032, document schema 1036, and databases 1028. Such an API can be maintained within each database server 1012. Alternatively, a single API can be a maintained (on, for example, processing server 1004) as a shared repository across multiple database servers 1012.

In a present embodiment, each client terminal 1008, scanner 1024 and database server 1012 is resident within a local domain 1040. The nature of local domains 1040 is not particularly limited, but in a present embodiment, domains 1040 represent the information technology infrastructures of professional services firms, such as law firms. Client terminal 1008 is configured to access and enter data into database 1028 via database server 1012.

Each database 1028 is configured to maintain electronic legal records representing government registrable intellectual property rights (IPR) from any jurisdiction in the world.

IPRs include, without limitation, patents, trademarks, industrial designs, utility models and copyrights. Other types of IPR will now occur to those skilled in the art. In the present embodiment, databases 1028 are heterogenous in relation to each other. For example, each database 1028-1, 1028-2, 1028-*n* is structured differently, in that they can be installed on different operating systems, can have different field mappings, different tables and different attributes. A person skilled in the art will now appreciate that other factors can make databases 1028 heterogenous. Thus, heterogenous can refer to any factor that makes it necessary to uniquely address, command or otherwise interact each database server 1012. Indeed, a database 1028 may be heterogenous relative to other databases 1028 for several reasons, such as, for example, because each database 1028 is configured with different field mappings, and/or because different software is used to store and manage each database. These and other aspects of the electronic legal records will be discussed in greater detail below.

Each document schema 1036 maintains a blueprint of electronic data files representing a respective document form (document form is analogous to document type). As will be discussed in further detail below, each document schema 1036-1, 1036-2, 1036-*o* represents different data structures of different document forms from patent and trademark offices in different jurisdictions. For example, document schema 1036-1 can represent the data structure of a United States Patent and Trademark Office (USPTO) patent application filing receipt document form, and document schema 1036-2 can represent the data structure of a Canadian Intellectual Property Office (CIPO) filing receipt document form. A person skilled in the art will now recognize that document schemas 1036 can represent different data structures of different document forms from patent and trademark offices around the globe.

Each target database schema 1032 maintains a blueprint of field mappings for its respective database 1028 for at least one document schema 1036. More specifically, each target database schema 1032 can correspond with at least one document schema 1036 to provide a field mapping between an extracted data variable and at least one destination field in its respective database 1028. For example, a filing date is a data variable that can be extracted from a USPTO filing receipt, as listed as part of the USPTO filing receipt document schema 1036. This example will be discussed in greater detail below. The destination field in database 1028 for the filing date is known via the target database schema 1032. Each target database schema 1032 can also include logic or other special handling instructions relative to the destination field. For example, such logic can include data normalization, such as normalization of date formats or application numbers. Such logic can also include conditional logic, such as parsing text strings into multiple destination fields, searching for keywords through large sections of text to perform conditional actions based on, for example, the presence of keywords. As another example such logic can include conditionally selecting one data field or another based on the contents of the extracted data. A person skilled in the art will now recognize the different target database schemas 1032 associated with at least one document schema 1036 can provide the mapping between extracted data variables and destination fields in respective databases 1028.

Figure 11:
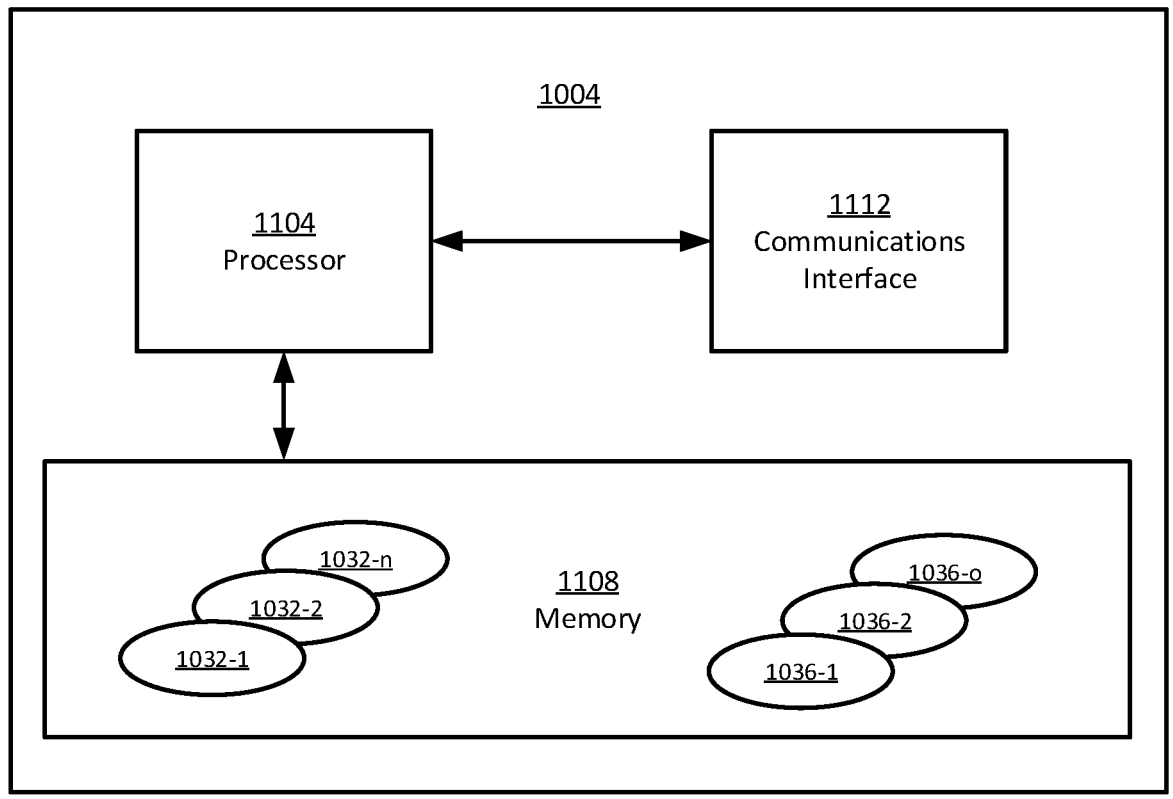
FIG. 11 depicts an example implementation of the processing server of FIG. 10.

Referring now to FIG. 11, processing server 1004 includes a processor 1104 (processor 1104 is an example implementation of professor 525), also referred to herein as a central processing unit (CPU), interconnecting a memory 1108 (memory 1108 is an example implementation of memory 520) and a communications interface 1112 (communications interface 1112 is an example implementation of communications interface 530). Processor 1104, memory 1108, and communications interface 1112 generally comprise one or more integrated circuits (ICs). A person skilled in the art will recognize that these components can have a variety of structures, such as a plurality of CPUs.

Communications interface 1112 allows processing server 1004 to connect to other computing devices via WAN 1016. Processing server 1004 can also include input devices (not shown) that connect to processor 1104, such as a keyboard and mouse, as well as output devices, such as a display. Alternatively, or in addition, the input and output devices can be connected to processor 1104 via communications interface 1112 via another computing device. In other words, input and output devices can be local to processing server 1004, or remote. A person skilled in the art will now recognize the availability of different input and output devices and that there are a variety of methods of connecting to processor 1104.

Memory 1108 can be, for example, any suitable combination of volatile memory (e.g., RAM) and non-volatile memory (e.g., ROM, EEPROM, flash memory, magnetic computer storage device, or optical disc).

Memory 1108 stores a plurality of computer-readable data and programing instructions, accessible by processor 1104, in the form of software objects such as various applications, queries, or types of data for use during the execution of those applications, including, but not limited to tunnel service 505, database 510, web engine 515, and file system 518. In the present embodiment, memory 1108 stores target database schemas 1032 and document schemas 1036, both of which can be used by processor 1104 to execute queries and other operations on databases 1028. A person skilled in the art will now recognize that various forms of computer-readable programming instructions stored in memory 1108 can be executed by processor 1104 as applications or queries.

In general, a person skilled in the art will now recognize that processing server 1004 can be implemented in a variety of ways, such as a standalone "tower" server, a virtual server, a server maintained on a hardware mounting rack within a data center. Future hardware configurations that are functionally equivalent to processing server 1004 are contemplated as within the scope of this specification.

Figure 12:
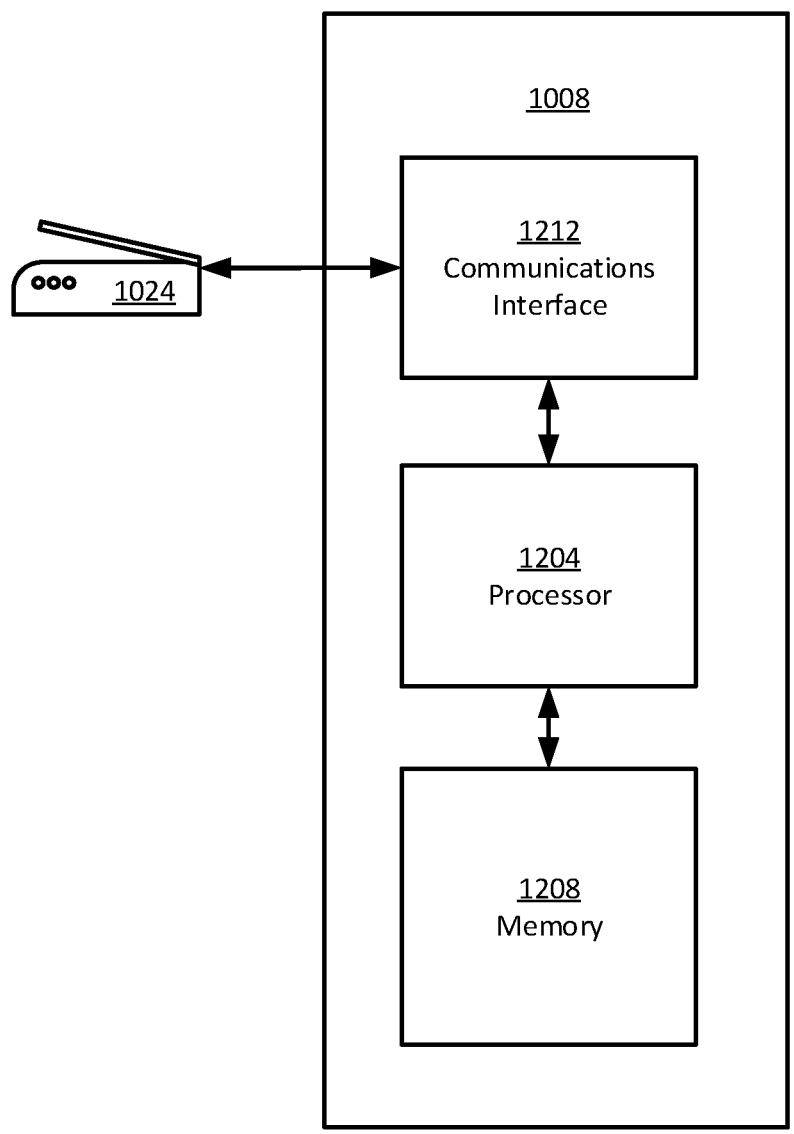
FIG. 12 depicts an example implementation of the client terminal of FIG. 10.

Referring now to FIG. 12, client terminal 1008 includes a processor 1204 (processor 1204 is an example implementation of processor 425) interconnecting a memory 1208 (memory 1208 is an example implementation of memory 420) and a communications interface 1212 (communications interface 1212 is an example implementation of communications interface 430). Processor 1204 can also connect with various input devices and output devices, in similar fashion to processor 1104 in processing server 1004. In the present embodiment, scanner 1024 is an example of an input device connected to processor 1204 in client terminal 1008 via communications interface 1212. Other examples of input and output devices include a keyboard and a mouse for input, and a monitor or a display for output. A person skilled in the art will now recognize the different input and output devices that can be connected to processor 1204 via communications interface 1212.

Client terminal 1008 can be a computing device such as, but not limited to, a desktop computer, a laptop computer, another server, a kiosk, a monitor or other suitable device. A person skilled in the art will now appreciate that other, different configurations of client terminal 1008 are contemplated. For example, client terminal 1008 combined with scanner 1024 could be implemented as a tablet computer or mobile device with an integrated camera to serve the function as scanner 1024.

Figure 13:
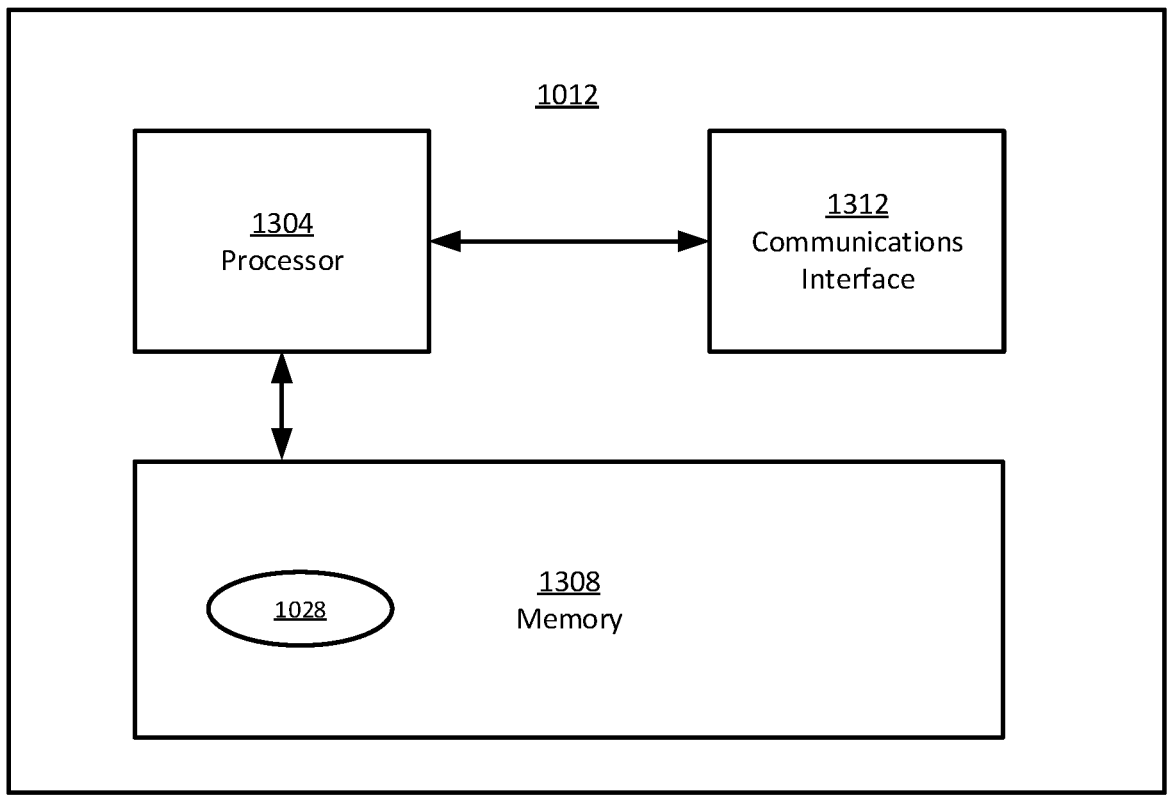
FIG. 13 depicts an example implementation of the database server of FIG. 10.

Referring now to FIG. 13, database server 1012 can be implemented in substantially the same way as processing server 1004 from FIG. 11, as well as the aforementioned variations and combinations of components and links. In the present example embodiment, database server 1012 comprises a processor 1304 (processor 1304 is an example implementation of processor 325), a memory 1308 (memory 1308 is an example implementation of memory 320) and a communications interface 1312 (communications interface 1312 is an example implementation of communications interface 330). In the present embodiment, memory 1308 stores database 1028, and that processor 1304 is configured to perform read, write and any other known or desired database operations on database 1028. A person skilled in the art will now recognize the variations and combinations of components and links that can be used to implement database server 1012, including those variations previously discussed in relation to processing server 1004.

Figure 14:
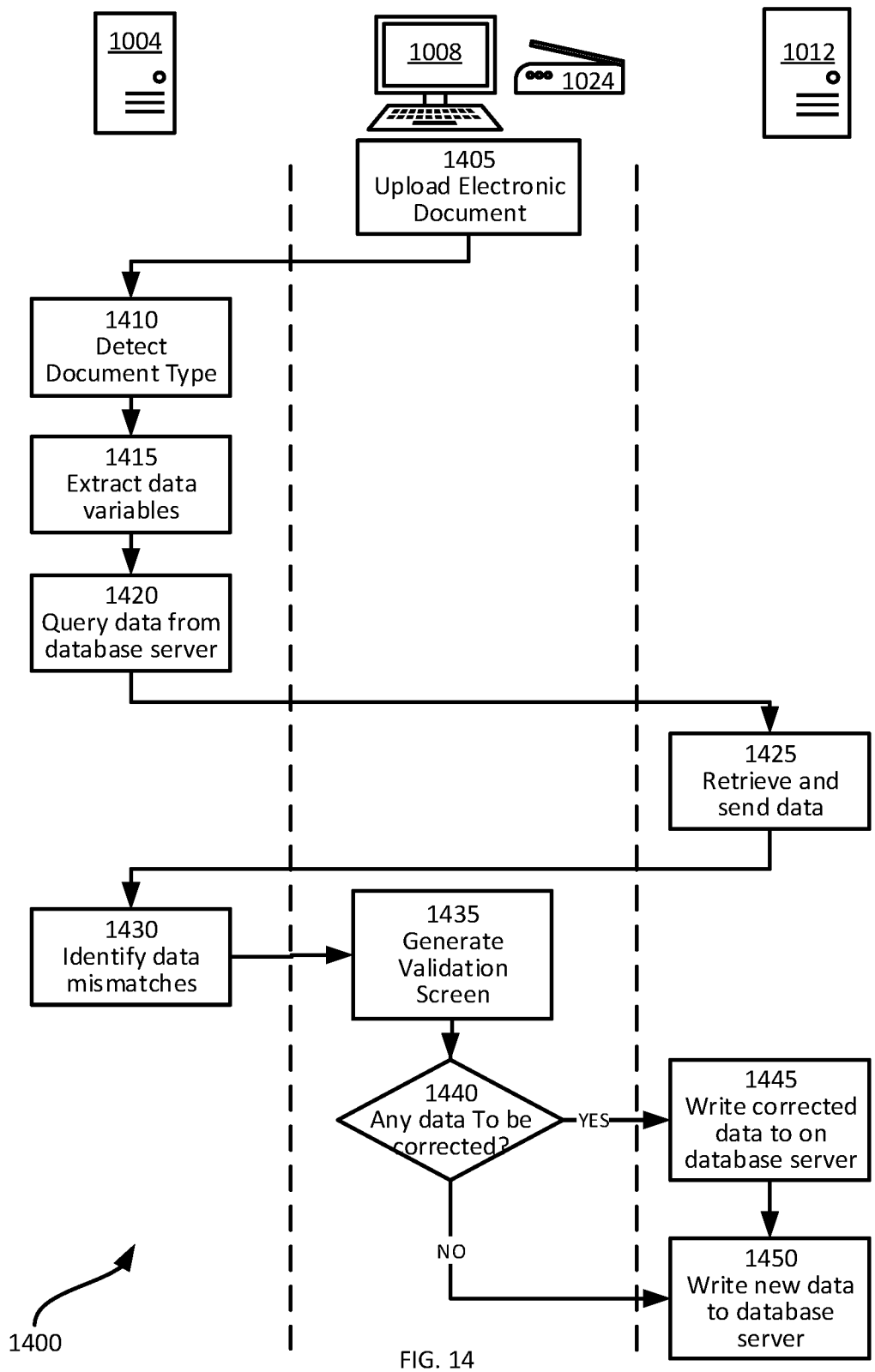
FIG. 14 depicts a method for automated data entry.

Referring now to FIG. 14, a method for automated data entry is represented in the form of a flowchart which is indicated generally at 1400. Method 1400 can be performed using system 1000, although it is to be understood that method 1400 can be performed on variations of system 1000, and likewise it is to be understood that method 1400 can be varied to accommodate variations on system 1000.

Prior to method 1400, tunnel client 405 and tunnel server 505 create a tunnel for secure bi-directional transfer of data for the purpose of establishing communications between processing server 1004 and database server 1012, with client terminal 1008 as a relay.

At block 1405, an electronic document file is uploaded via a front-end interface on browser 410 on client terminal 1008. More specifically, in a present embodiment, the electronic document file is obtained by scanning a paper-based document form using scanner 1024. As will be discussed further below, by way of a non-limiting illustrative example shown in FIG. 15, it will be assumed that the scanned electronic document file is a USPTO patent application filing receipt document form 1044-1 (Hereafter, USPTO patent application filing receipt document form 1044-1 will be referred to as document form 1044-1 or USPTO filing receipt 1044-1.) Also of note, as will be discussed further below, document form 1044-1 corresponds to document schema 1036-1.

Referring again to FIG. 14, at block 1410, processing server 1004 detects the received document form and applies the corresponding document schema 1036. (If the processing server 1004 fails to detect the correct corresponding document schema 1036 to the received document form, then an exception handling process can be invoked. Failure to detect the correct corresponding document schema 1036 happens prior to block 815.) According to our illustrative example, assuming that the document form is successfully detected as a USPTO filing receipt 1044-1 from the collection of known document forms, then at block 1415 processing server 1004 commences using the corresponding document schema 1036-1 as a blueprint to extract a case reference (or other unique identifier) and corresponding data variables. The means used at block 1410 for detecting the appropriate document type is not particularly limited, but can be effected by, for example, the technique described in PCT Application PCT/IB2018/050533, the contents of which are incorporated herein by reference.

By way of further explanation of our illustrative example, FIG. 15 depicts a concrete example of a USPTO filing receipt 1044-1. As noted previously, USPTO filing receipt 1044-1 has a corresponding USPTO filing receipt document schema 1036-1. USPTO filing receipt document schema 1036-1 defines a case reference and other data variables to extract from document form 1044-1.

A case reference is a unique identifier corresponding to a specific electronic legal record in database 1028. For example, a case reference can be an application number for a patent that has been filed at the USPTO. Another example of a case reference can be the attorney docket file number such as those commonly employed in filing systems of law firms. According to the illustrative example in the FIG. 15, in USPTO filing receipt 1044-1, data field 1504 is a case reference, specifically application Ser. No. 15/999,999. The electronic legal record in database 1028 also stores the aforementioned application number as a unique identifier within database 1028, allowing system 1000 to correctly identify the corresponding electronic legal record linked to the data on a specific USPTO filing receipt 1044-1. A person skilled in the art will now recognize different possible case references for electronic legal records.

In a more general sense, the person skilled in the art will now recognize that different data variables on each document form map to counterpart data variables in a respective document schema 1036 and also correspond to specific records and data variables within the set of electronic legal records in database 1028. More specifically, data variables are specific fields of information within an electronic legal record, and can include, but are not limited to dates, deadlines, names of inventors and applicants. Returning to our illustrative example, as shown in FIG. 15, a filing-date data variable 1508, a priority-data data variable 1512, and a date-mailed data variable 1516 are all data variables that are extracted from USPTO filing receipt document form 1044-1. A person skilled in the art will now recognize the different data variables that can be associated with different document forms and their respective document schemas 1036, which in turn correspond to different electronic legal records in database 1028.

Figure 16:
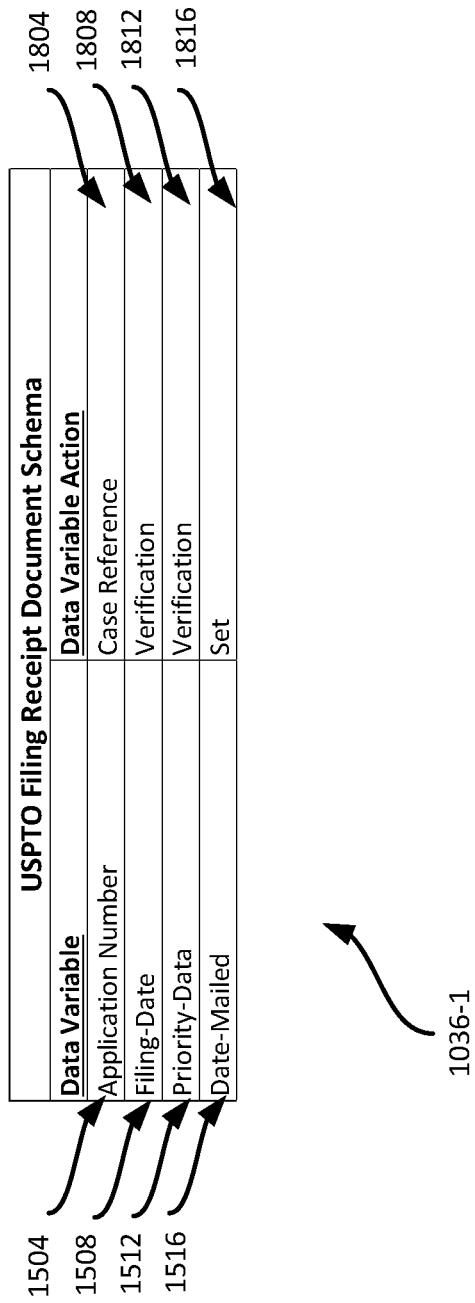
FIG. 16 depicts an illustrative example of a document schema.

Continuing with the present illustrative example, FIG. 16 depicts an example document schema 1036, specifically a USPTO filing receipt document schema 1036-1. Each data variable from USPTO filing receipt 1044-1 corresponds to an action that is designated within USPTO filing receipt document schema 1036-1. In the present embodiment, USPTO filing receipt document schema 1036-1 has four data variables: application number case reference data variable 1504, filing-date data variable 1508, priority-data data variable 1512, and date-mailed data variable 1516. A person skilled in the art will now recognize the different data variables that can be incorporated into a document schema 1036. Each data field has a corresponding action that acts as a blueprint that defines how data variables are to be handled within a particular, respective destination database 1028. In FIG. 16, a "Case Reference" data variable action 1804 uses a unique identifier to locate a corresponding specific electronic legal record in database 1028. A first "Verification" data variable action 1808 and a second "Verification" data variable 1812 performs a comparison between the corresponding data variable extracted from document form 1044-1 and the same respective data variables from database 1028, for the purposes of determining whether an extracted data variable on a given document form matches an expected data variable within the relevant specific electronic legal record on database 1028. A "Set" data variable action 1816 is for writing the value of the extracted data variable from the document form to destination fields within the corresponding record in database 1028. Those skilled in the art will now recognize that at least one "Case Reference" data variable action is utilized for each schema 1036. (A plurality of "Case Reference" data variable action can also be implemented, if desired, as alternatives or for redundancy-checking or other purposes.) Furthermore, at least one "Verification" data variable action and/or at least one "Set" data variable action are typically located within each schema 1036.

In the illustrative example of USPTO filing receipt document schema 1036-1, the application number data variable 1504 is used by the "Case Reference" data variable action 1804 to locate the corresponding record in database 1028. Filing-date data variable 1508 and priority-data variable 1512 is used by "Verification" data variable action 1808 and "Verification" data variable action 1812 respectively. Date-mailed variable 1516 is used by "Set" data variable action 1816. For further clarification, in this example, USPTO filing receipt document schema 1036-1 acts as a blueprint which indicates that after an electronic legal record is located based on application number 1504, filing-date data variable 1508 and priority-data data variable 1512 are to be verified against corresponding values that are presently populated within a corresponding record and its destination fields in database 1028, and that the date-mailed data variable 1516 is to be set to a corresponding empty destination field on database 1028. (A "Verification" data variable can also be configured to have an "Set" or "update" function, whereby the extracted data is set to a corresponding destination field on database 1028 that needs to be corrected or otherwise updated.) A person skilled in the art will now recognize the role of the document schema 1036 and will now recognize the different combinations and functions in which data variable actions can be associated with data variable actions. These data variable actions will be further discussed in greater detail below.

Figure 17:
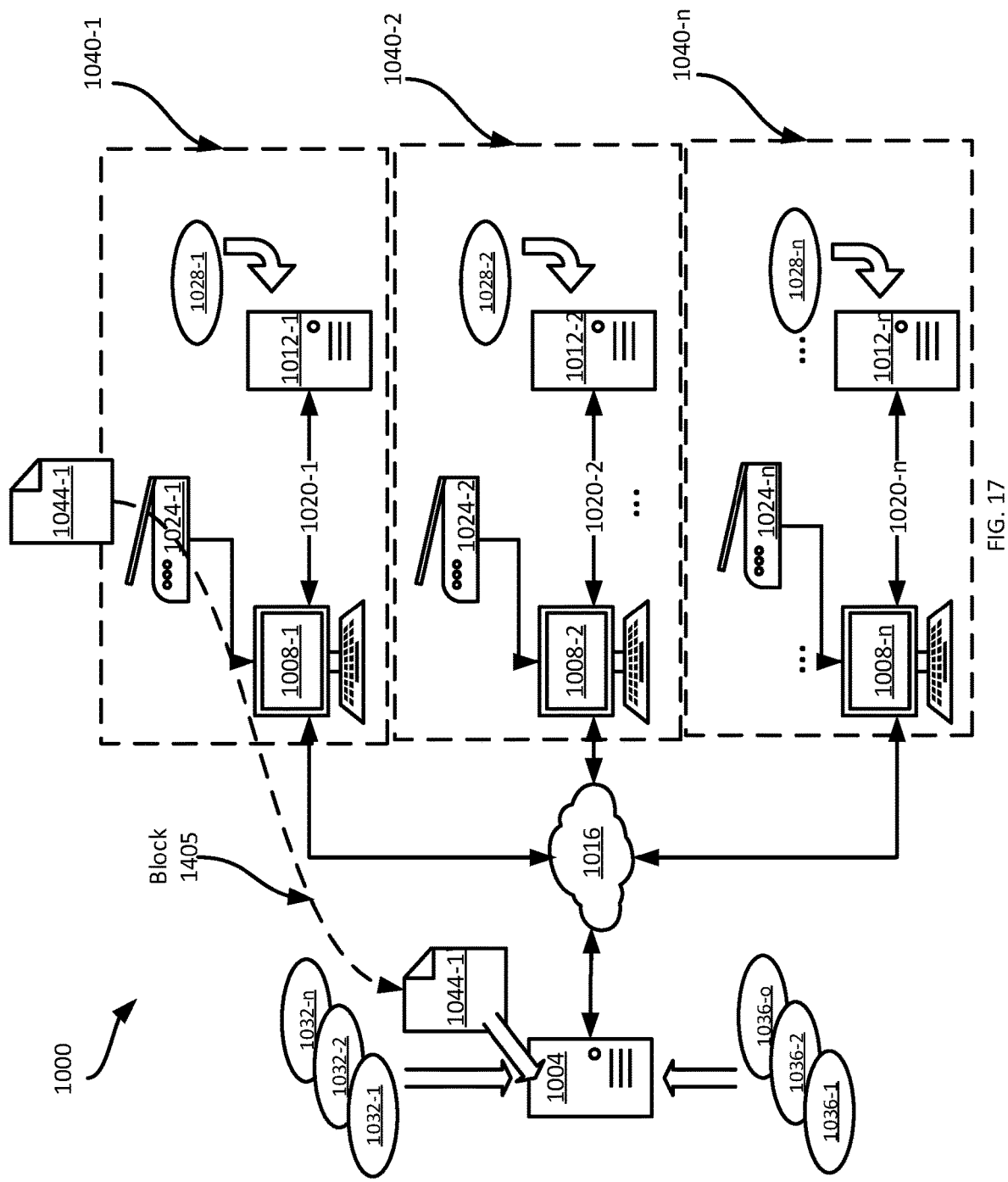
FIG. 17 depicts an example of the method depicted in FIG. 14 with the USPTO filing receipt being scanned and converted into a USPTO filing receipt electronic data file.

Continuing with the present illustrative example of method 1400, in FIG. 17, block 1405 is represented as USPTO filing receipt 1044-1 being scanned with scanner 1024-1, and converted into a USPTO filing receipt electronic data file 1044-1' via client terminal 1008-1. The electronic data file 1044-1', which is typically an image file, is then uploaded via a front-end interface executing on client terminal 1008-1 to processing server 1004. The file format for electronic data file 1044-1' is not particularly limited and can be, for example, a portable document format ("PDF") or other type of image file.

Figure 18:
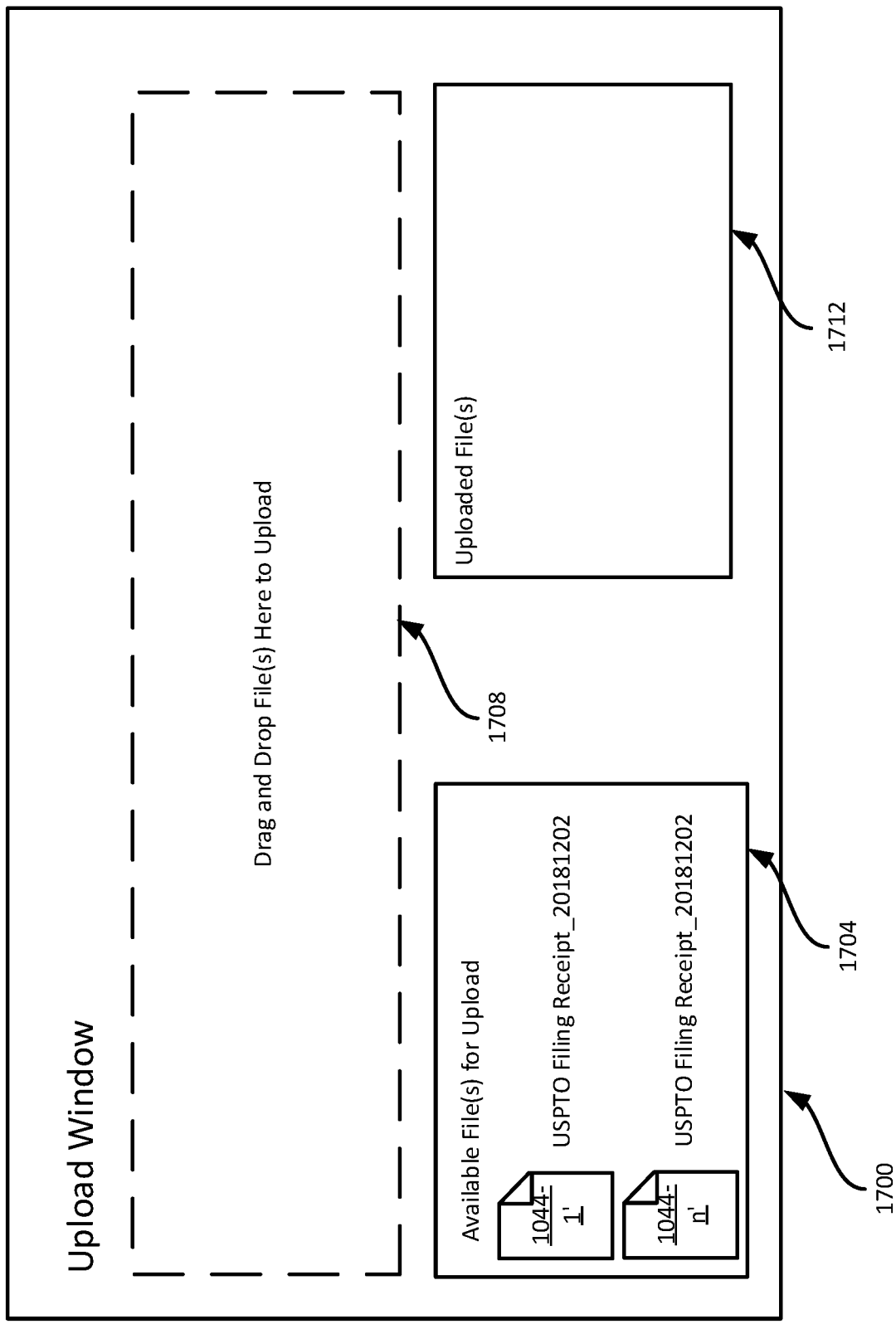
FIG. 18 depicts a non-limiting illustrative example of the front-end interface.

FIG. 18 shows a non-limiting illustrative example of a front-end interface 1700 that can be generated on a given client terminal 1008 via web browser 410 and configured for uploading electronic data files from client terminals 1008 to processing server 1004 at block 1405. In FIG. 18, interface 1700 comprises a first window 1704 that lists available files that are stored on client terminal 1008-1, including the image of USPTO filing receipt 1044-1' as scanned from USPTO filing receipt 1044-1. Interface 1700 includes a second window 1708 where files within window 1704 can be "dragged and dropped" (or other equivalent input command) in order to initiate block 1405. Interface 1700 also comprises a third window 1712 that shows a list of uploaded files that are now stored upon server 1004 upon completion of block 1405. Interface 1700 is typically generated by processing server 1004 (typically as a secure web-page on web browser 410, but other means are contemplated) for client terminal 1008. The person skilled in the art will now appreciate that, in this embodiment, by using a web-page the amount of local configuration at client terminal 1008 to implement system 1000 is reduced and requires reduced utilization of computing resources at client terminal 1008 as compared to implementing the functionality of server 1004 within each client terminal 1008.

According to block 1410, processing server 1004 is configured to detect the document type from block 1405. In the illustrative example of block 1410, processing server 1004 detects that USPTO filing receipt 1044-1 is of the type corresponding to a USPTO filing receipt document and locates the corresponding document schema 1036-1. According to block 1415, processing server 1004 applies the corresponding document schema 1036-1 to extract the case reference and corresponding data variables from the USPTO filing receipt 1044-1. A person skilled in the art will now recognize that different variations of document form types, (i.e. in addition to USPTO filing receipt 1044-1) and different variations of extracted data pertaining to each document type, are contemplated and can be maintained within a respective document schema 1036.

At block 1420, processing server 1004 queries data variables (using the variables extracted from block 1415) within an electronic legal record maintained within a respective database 1028, as designated by the extracted case reference and the document schema 1036 respective to the detected document type from block 1410. These queries are performed on database 1028 via database server 1012. At block 1425, database server 1012 responds to the query and sends the requested existing data from database 1028 back to the processing server 1004. As will be discussed further below, the queried data variables can be used for comparison to the extracted data variables from block 1415.

Figure 19:
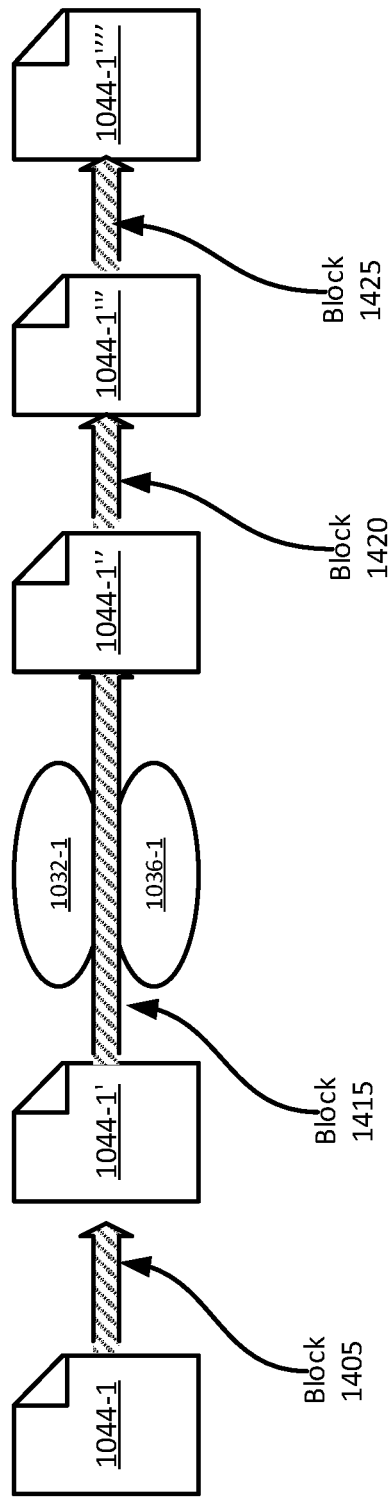
FIG. 19 depicts performance of various blocks of FIG. 14 by showing a series of transformations based on operations performed on a USPTO filing receipt.

FIG. 19 is provided to further illustrate the foregoing. Referring now to FIG. 19, performance of block 1405, block 1415, block 1420 and block 1425 (as it relates to the processing of the illustrative example USPTO filing receipt 1044-1) is schematically represented, by showing a series of transformations based on operations performed on filing receipt 1044-1. The hardware elements performing such transformations are omitted from FIG. 19 for convenience of illustration, but a person skilled in the art will now recognize that the hardware elements in system 1000 can be utilized to effect such transformations. Of particular note, USPTO filing receipt 1044-1 is shown as being scanned as per block 1405 and converted into USPTO filing receipt electronic data file 1044-1'. In turn, at block 1415, USPTO filing receipt electronic data file 1044-1' is processed using its corresponding document schema 1036-1 in conjunction with the target database schema 1032-1 respective to client terminal 1008-1, in order to extract the relevant data from USPTO filing receipt electronic data file 1044-1'. The result of block 1415 is an extracted electronic data file 1044-1". At block 1420, an electronic data file query 1044-1''' is generated from extracted electronic data file 1044-1" and sent to database server 1012-1. In turn, at block 1425, database server 1012-1 queries target database 1028-1 and generates electronic data file response 1044-1"".

Figure 20:
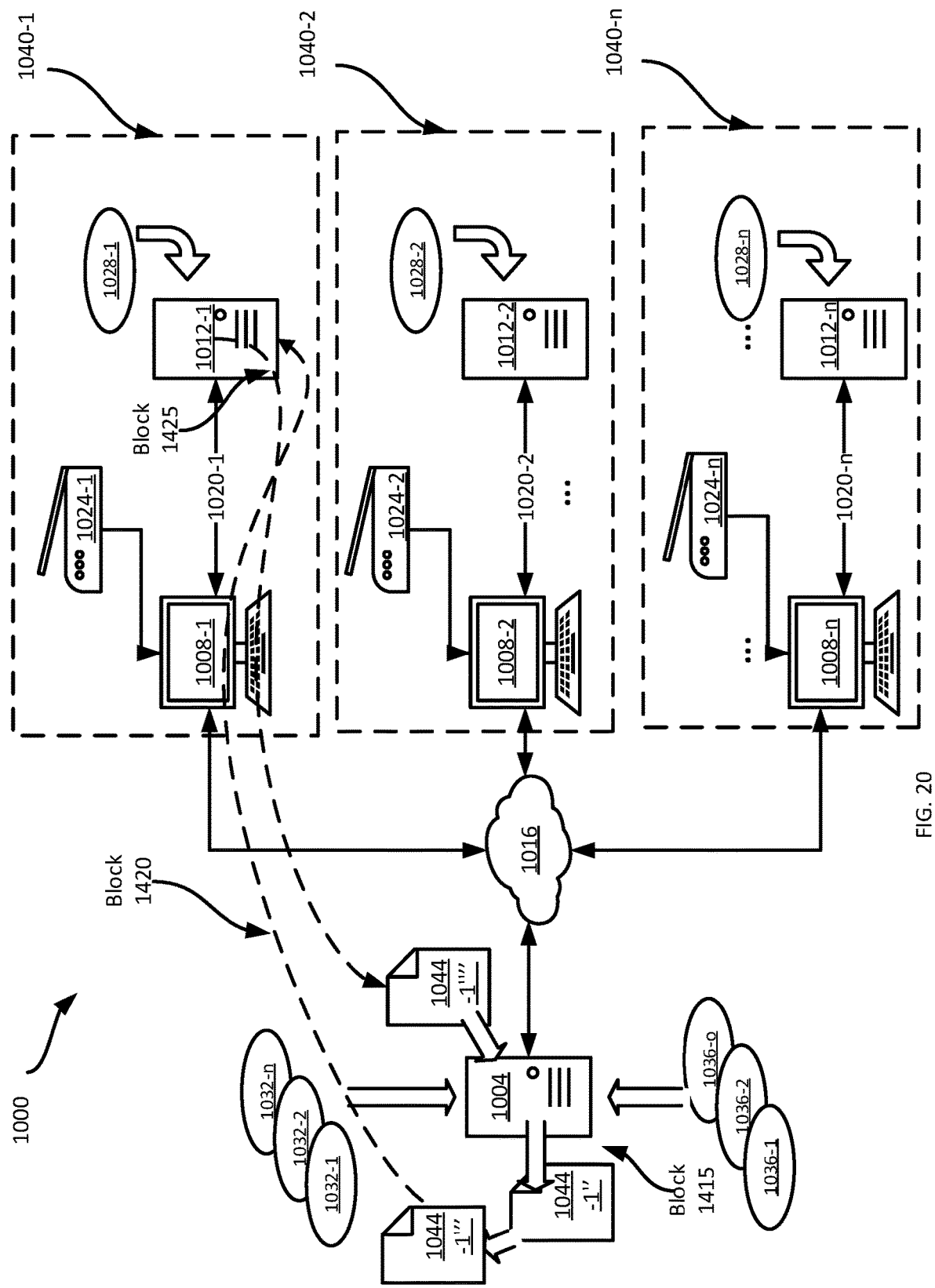
FIG. 20 depicts the flow of the electronic data file query of FIG. 19 from the processing server to the database server, and the return of the electronic data file response from the database server to the processing server.

For further illustration, FIG. 20 is provided which shows, inter alia, the flow of electronic data file query 1044-1''' from processing server 1004 to database server 1012-1, and the return of electronic data file response 1044-1"" from database server 1012-1 to processing server 1004.

As part of this particular illustrative example of USPTO filing receipt 1044-1, since the case reference application Ser. No. 15/999,999, then processing server 1004 queries database 1028-1 for all data variables with a verification data variable action within the corresponding document schema 1036-1 on a case with the application Ser. No. 15/999,999 as maintained within database 1028-1 on database server 1012-1.

At block 1430, processing server 1004 compares the existing data queried from database 1028-1 against the extracted data from block 1415.

At block 1435, the results of the comparison are displayed on the front-end interface 1700 on client terminal 1008. If data mismatches are present, a means to receive instructions to correct or update any data can be provided on the front-end interface.

Figure 21:
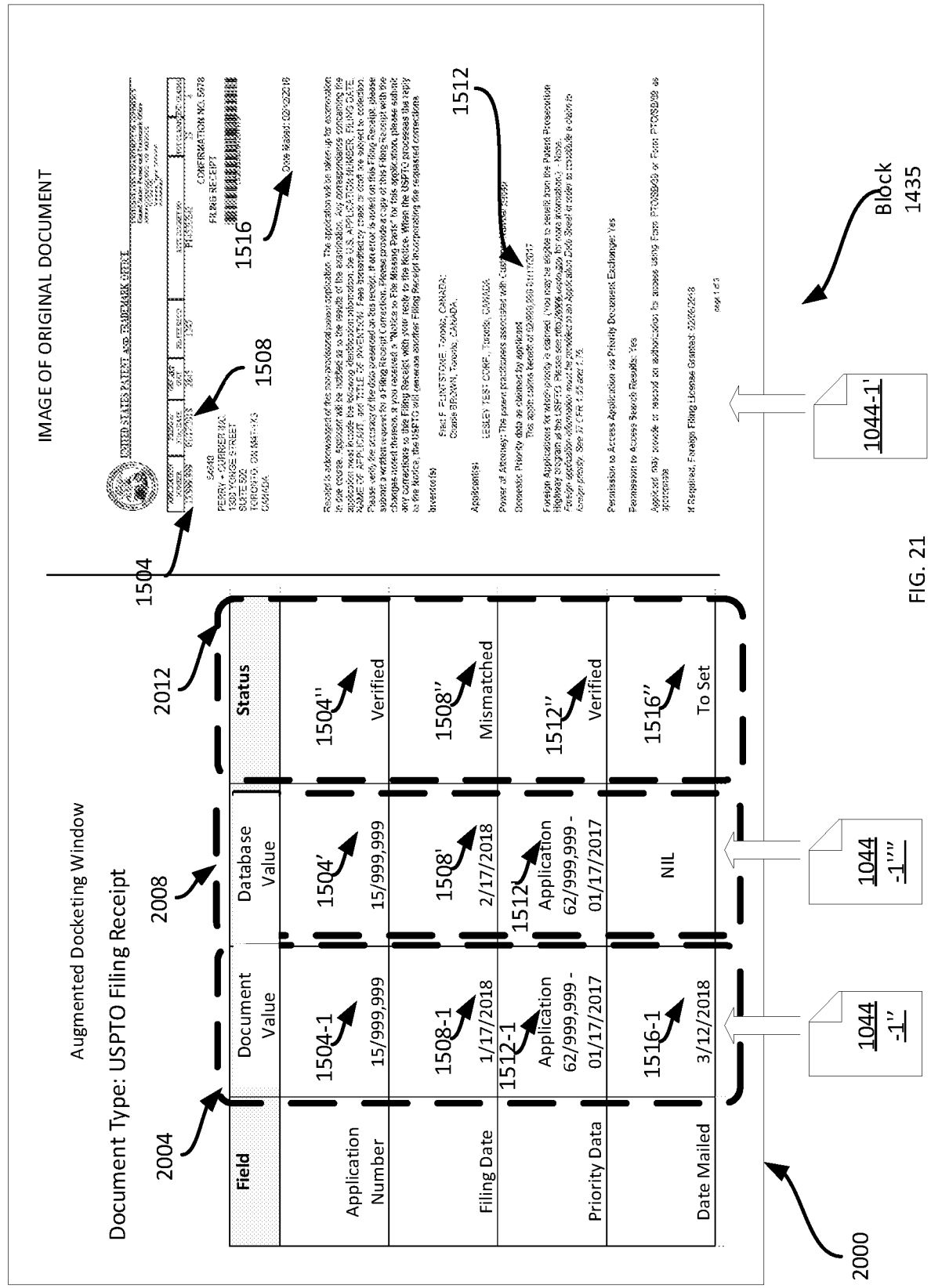
FIG. 21 depicts an example graphical interface that can be generated at a block on the client terminal and can be indicated as an interface.

Referring now to FIG. 21, and continuing with the illustrative example, a sample graphical interface that can be generated at block 1435 on client terminal 1008-1 is indicated as interface 2000. Interface 2000 is typically generated by processing server 1004 (typically as a secure web-page, but other means are contemplated), and effectively provides a client-application on client terminal 1008. More specifically, in the present embodiment, interface 2000 showcases the data comparison between electronic data file response 1044-1"" (generated at block 1420) against the extracted data in electronic data file query 1044-1" (generated at block 1415). Interface 2000 also displays the image USPTO filing receipt electronic data file 1044-1'.

In FIG. 21, column 2004 shows the contents of extracted electronic data file 1044-1", namely, the data variables as extracted at block 1415 from USPTO filing receipt 1044-1. Column 2008 shows the contents of electronic data file response 1044-1"", namely, the response from the queried of database 1028. Each cell in column 2012 shows a comparison status between the other two values in the same row, including whether there is a data mismatch present. In the present illustrative example of USPTO filing receipt 1044-1, variable 1504, variable 1508, variable 1512 and variable 1516 and are displayed in column 2004 as variable 1504-1, variable 1508-1, variable 1512-1 and variable 1516-1 respectively. In this example, the filing date variable 1508 has a date value of Jan. 17, 2018, which was extracted at block 1415, and is displayed as variable 1508-1 on interface 2000. A comparison is then shown between 1508-1 and the filing-date data variable 1508' from database 1028-1. Continuing with the illustrative example, the comparison of variable 1508-1 and variable 1508' reveals a mis-match and will hence display status 1508" in column 2004 as "Mismatched". In another illustrative example in FIG. 20, the priority-data data variable 1512 as extracted and displayed on the front-end interface as data variable 1512-1 has the same value as data variable 1512', and hence the corresponding row in column 2012 displays status 1512" as "Verified". A person skilled in the art will now be able to recognize the different combinations and variations of data comparison.

Further to the example in FIG. 21, certain cells may contain "NIL" values and as such can be candidates for "Set" data variable actions 1816 within database 1028-1. In the present illustrative example, the date mailed variable 1516-1 of USPTO Filing Receipt 1044-1 is to be docketed and therefore written into database 1028-1. As such, there is a "NIL" value column 2008, in response to the query of database 1028, and accordingly status 1516" in column 2012 includes a prompt "To Set", inviting input via interface 2000 to instruct writing of date mailed variable 1516-1 into the corresponding field in database 1028-1. A person skilled in the art will now be able to recognize the different combinations and variations that can be performed on database 1028 based on, for example, different types of forms.

In certain implementations, not shown in the Figures, interface 2000 can be configured to solicit input at client terminal 1008 to facilitate correction of any data variables 1044-1 queried from database 1028 under column 2012 that are flagged as "Mismatched", such as variable 1508'. (Interface 2000 can be generated in much the same fashion as interface 1700). This is depicted at block 1440. At block 1445, assuming such data is thusly corrected, then the corrected data variables are written into the corresponding destination fields on database 1028 as designated by target database schema 1032. In the present illustrative example, data variable 1508' can be corrected to "Jan. 17, 2018" to match the actual value found in filing-date data variable 1508 on the USPTO filing receipt 1044-1. The instruction to indicate such correction can be received via an appropriately modified version of front-end interface 2000. Accordingly, the value of "Jan. 17, 2018" can be written into database 1028 into the destination field as designated by target database schema 1032-1 and document schema 1036-1.

Figure 22:
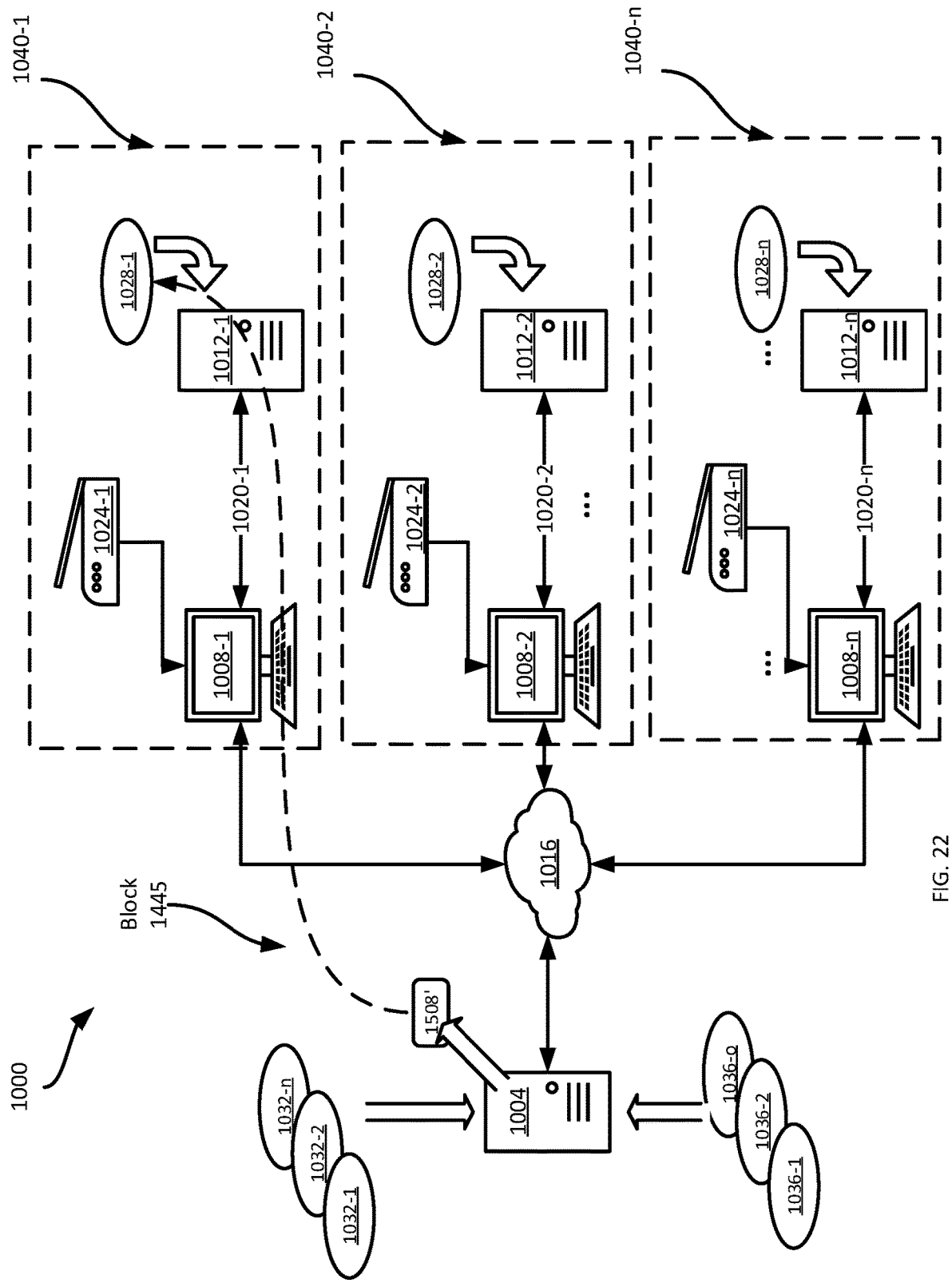
FIG. 22 depicts the processing server writing the corrected filing date data variable into the database.

In the present embodiment, FIG. 22 depicts processing server 1004 generating the write instruction of the corrected filing date data variable 1508' and sending the write instruction to database 1028-1. The write instruction is generated by processing server 1004 based on document schema 1036-1 in order to identify the correct field on form 1044-1, and additionally the write instruction is generated based on target database schema 1032-1 which is used to identify the correct target field of the correct record within database 1028-1, ultimately generating a write instruction that corresponds to expected form and substance of write instructions that are native to database server 1012-1 and database 1028-1. A person skilled in the art will now be able to recognize the different combinations and variations of fields and data variables that can be written to database 1028 to ensure that the data in database 1028 is accurate and matches the data of different document forms 1044.

Figure 23:
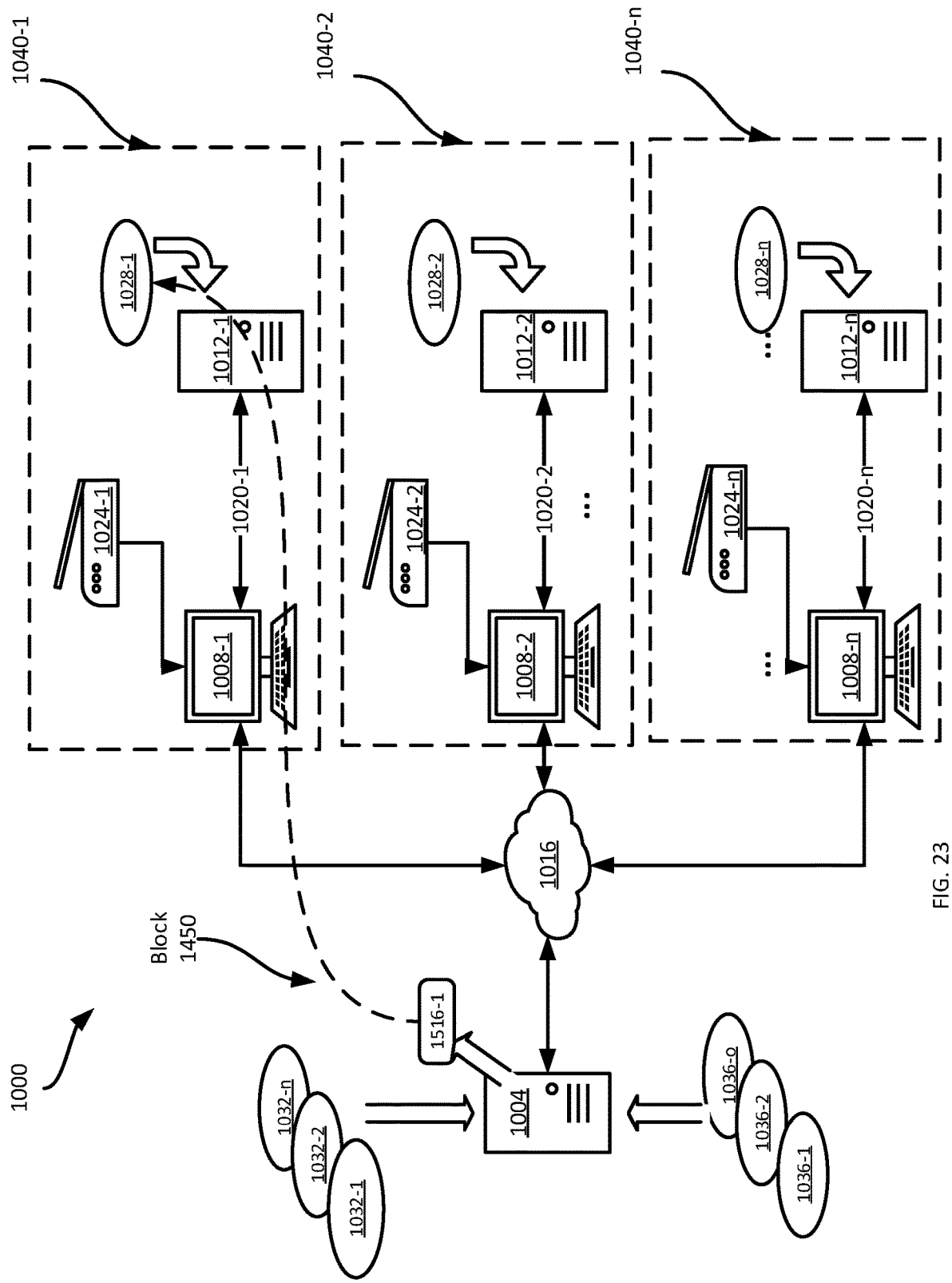
FIG. 23 depicts the processing server writing the date mailed data variable, encompassed within the USPTO filing receipt, to the database.

If there are no "Mismatched" statuses displayed under column 2012, data variables from the USPTO Filing Receipt 1044-1 that have associated "Set" data variable action 1816 will be written to database 1028, as depicted at block 1450. FIG. 23 continues with this illustrative example, where processing server 1004 is depicted as writing date mailed data variable 1516-1, encompassed within USPTO Filing Receipt 1044-1, to database 1028-1. The writing of date mailed data variable 1516-1 is based on a write instruction that is generated using target database schema 1032-1 and document schema 1036-1 to determine the appropriate destination location within database 1028-1. The person of skill in the art will now appreciate that this write instruction is generated in a similar fashion to the write instruction discussed in relation to updating of "Mismatched" data, as discussed above in relation to FIG. 22. A person skilled in the art will now recognize that different document forms, document schemas 1036 and target database schemas 1032, allow the verification and writing of data variables to heterogenous databases 1028.

Figure 24:
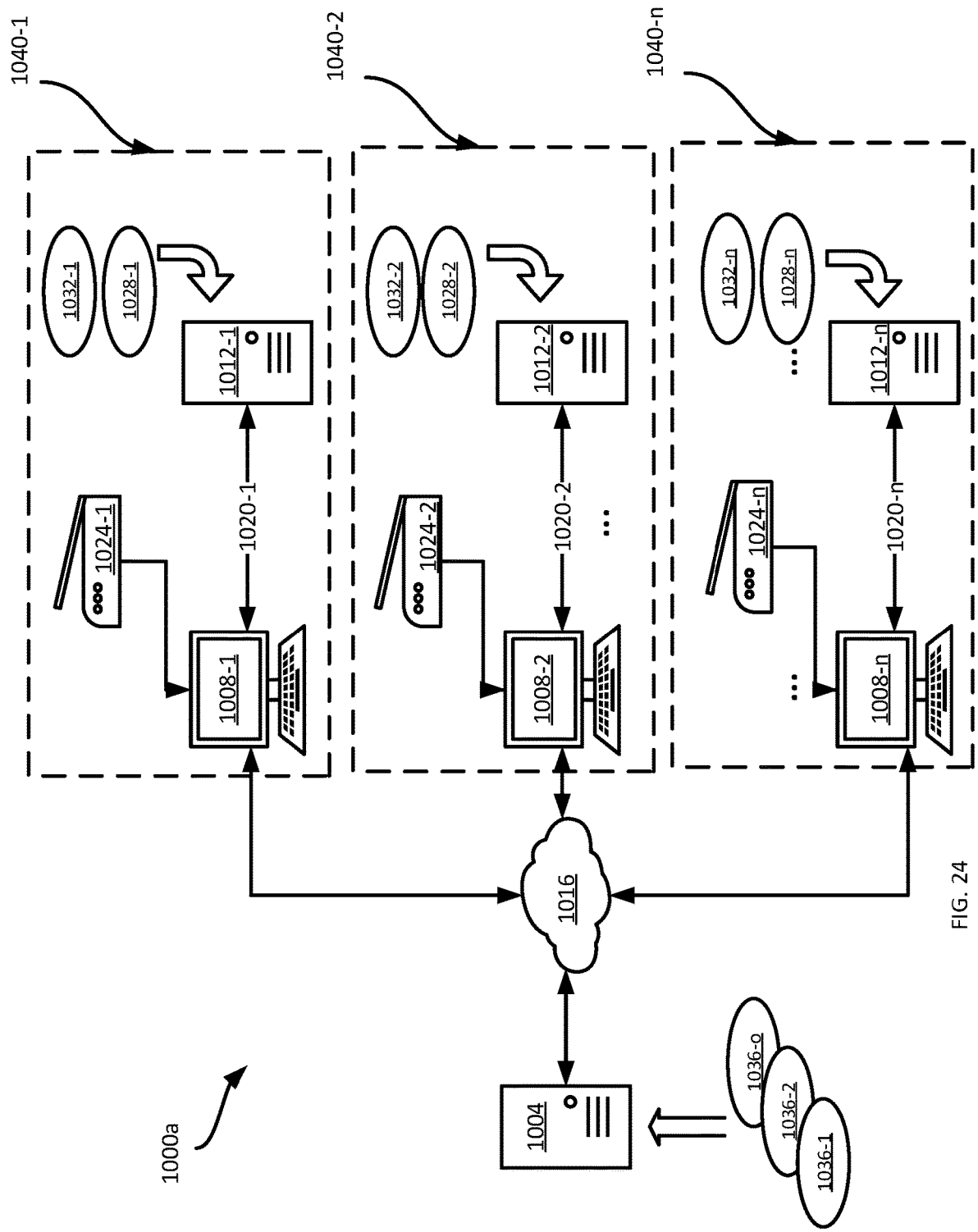
FIG. 24 depicts another automated data entry system.

According to another embodiment, FIG. 24 depicts another automated data entry system indicated generally at 1000a. System 1000a is a variant on system 1000 and thus like elements in system 1000a bear like references to counterpart elements in system 1000. Of note is that in system 1000a, each target database schema 1032 is maintained on its respective database server 1012. In this alternative embodiment, when locating destination fields for either querying data, or writing data to database 1028, target database schema 1032 is accessed by processing server 1004 from its location on its respective database server 1012 rather than processing server 1004. In this fashion it will now be apparent that system 1000 can be implemented in other ways, in addition to system 1000a.

Figure 25:
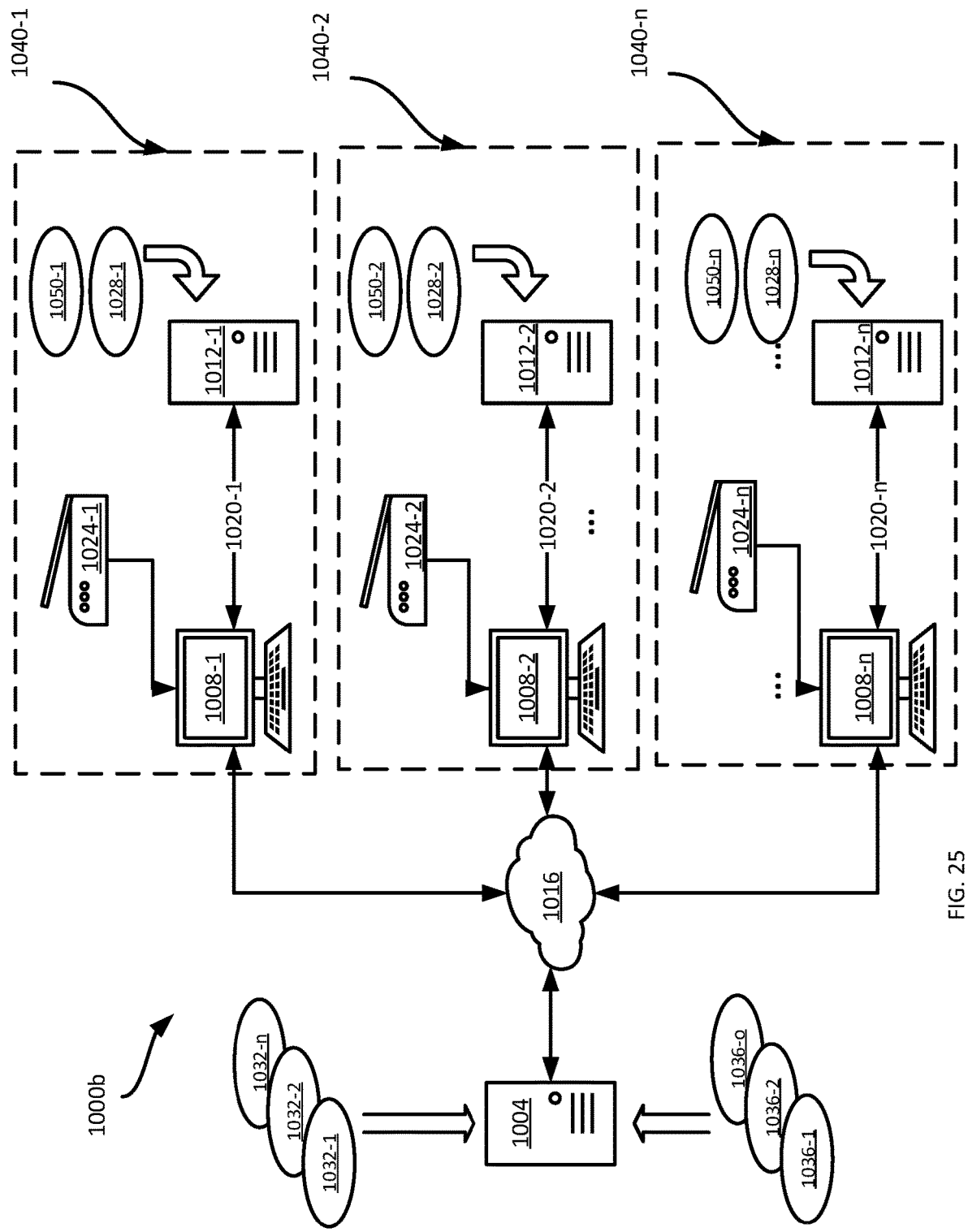
FIG. 25 depicts another automated data entry system.

Indeed, according to another embodiment, FIG. 25 depicts another automated data entry system indicated generally at 1000b. System 1000b is a variant on system 1000 and thus like elements in system 1000b bear like references to counterpart elements in system 1000. Of note is that in system 1000b, an application programming interface ("API") 1050 resides respectively to each database server 1012. In system 1000, the functionality of API 1050 is implicitly incorporated into the target database schema 1032 that is respective to a given target database 1028. However, in system 1000b the API is not resident within target database schema 1032 but is maintained locally on the respective server 1028. As such target database schema 1032 within system 1000b maintains field mappings between document schemas 1036 and the respective target database 1028, but actual commands (read, write, etc.) are maintained within the API 1050 locally on the respective target database 1028. In this fashion, bandwidth over links 1016 and 1020 can be reduced in system 1000b by shifting the functionality of API 1050 to the target database server 1012. Further variations and combinations of system 1000, system 1000a and system 1000b will now occur to a person skilled in the art, such as replication of business logic within API 1050.

While the foregoing describes certain embodiments and illustrative examples, a person of skill in the art will now recognize that variations, combinations and subsets thereof are contemplated. For example, scanner 1024 can be omitted where document forms 1044, or an eXtended Markup Language (or equivalent language) version of those document forms 1044, are retrieved electronically directly from the relevant Patent and Trademark Office online database. To explain this example further, electronic data file USPTO filing receipt 1044-1' can be obtained by means other than scanner 1024, such as downloading directly from a patent and trademark office database or other source.

As another example variation, interface 1700 and interface 2000 and other interfaces generated on terminal 1008 can be implemented on a server separate from server 1004 and/or via a communication gateway server (not shown). These interfaces can be hosted as secure socket layer (SSL) web pages and include a keep-alive heart with terminal 1008, such that if the connection over link 1016 fails then an exception handling message can be generated on terminal 1008 indicating that the interface needs to be reestablished.

As another example, extracted data on forms 1044 may be stored in a different format on server 1012 than the form in which they were extracted. In this event, target database schemas 1032 can include data normalization instructions to convert the extracted data into the proper form for storage.

A person of skill in the art will now appreciate a variety of advantages are afforded by these teachings. A general advantage includes the provision of an automated system for entering docketing data across heterogenous target databases 1028 that involves minimal configuration changes to existing target databases 1028. As another example, in FIG. 22 it was discussed how processing server 1004 of system 1000 can generate a write instruction to place data variable 1508' into database 1028-1, whereby such a write instruction can be generated by processing server 1004 based on document schema 1036-1 to identify the correct field on form 1044-1, and also based on target database schema 1032-1 which is used to identify the exact field within database 1028-1 that corresponds to form 1044-1, and ultimately generating a write instruction that corresponds to expected write instructions at database 1028-1. However, system 1000 is flexible because it can work for heterogenous databases 1028 using different database schemas 1032 while the same document schema 1036 can be used for all heterogenous databases 1028. Advantageously, this can obviate the need to natively maintain a plurality of document schemas 1036 at each database 1028. It is to be understood that these advantages are non-limiting and may only apply to certain embodiments and are not intended to unduly limit the scope of the claims.

Applications of the present invention may extend beyond the legal industry to other industries where large amounts of documents and information may be received on a daily basis. For example, physicians may opt to maintain Electronic Medical Records (EMR) for their patients instead of hard copies, as EMR provide much greater ease for accessing and retrieving files, backing-up existing records, and transferring records to another physician or institution. The system disclosed herein may be used to analyze and docket a variety of documents such as medical lab results and the like.

What is claimed is:

1. A processing server comprising:
a memory storing a plurality of data objects including at least one document schema and at least one target database schema corresponding to at least one target database hosted by a database server distinct from the processing server;
a network interface connecting the processing server, via a network, to a client terminal connected with the database server via the network;
a processor interconnected with said memory and said network interface; said processor configured to:
receive an electronic data file from said client terminal representing an unprocessed document;
associate said unprocessed document with said at least one document schema and extract a data variable from the unprocessed document based on said document schema, wherein said document schema represents an intellectual property form;
generate a database operation, the database operation comprising said data variable, according to said at least one target database schema; and
transmit said database operation via said network to the client terminal, for relaying to the database server via the client terminal, and for execution against said target database.

2. The processing server of claim 1 wherein said intellectual property form is a filing receipt and said data variable is an application number.

3. The processing server of claim 1 wherein said processor is further configured to generate a validation screen on said client terminal for identifying whether said data variable requires correction.

4. The processing server of claim 3 wherein said processor is configured to receive said correction and generate said database operation based on said correction.

* * * * *